(12) United States Patent
Ahmed et al.

(10) Patent No.: US 8,914,837 B2
(45) Date of Patent: Dec. 16, 2014

(54) DISTRIBUTED INFRASTRUCTURE

(71) Applicant: Biscotti Inc., McKinney, TX (US)

(72) Inventors: Syed Nadeem Ahmed, Allen, TX (US); Matthew B. Shoemake, Allen, TX (US)

(73) Assignee: Biscotti Inc., McKinney, TX (US)

( * ) Notice: Subject to any disclaimer, the term of this patent is extended or adjusted under 35 U.S.C. 154(b) by 0 days.

(21) Appl. No.: 14/106,360

(22) Filed: Dec. 13, 2013

(65) Prior Publication Data

US 2014/0173675 A1    Jun. 19, 2014

Related U.S. Application Data

(60) Provisional application No. 61/877,928, filed on Sep. 13, 2013, provisional application No. 61/874,903, filed on Sep. 6, 2013, provisional application No. 61/872,603, filed on Aug. 30, 3013, provisional application No. 61/858,518, filed on Jul. 25, 2013, provisional application No. 61/759,621, filed on Feb. 1, 2013, provisional application No. 61/737,506, filed on Dec. 14, 2012.

(51) Int. Cl.
*H04N 7/173* (2011.01)
*H04N 21/2743* (2011.01)
*H04N 5/232* (2006.01)
*H04N 21/422* (2011.01)
*H04N 21/4223* (2011.01)
*H04N 21/44* (2011.01)

(52) U.S. Cl.
CPC ....... *H04N 21/2743* (2013.01); *H04N 5/23206* (2013.01); *H04N 21/42203* (2013.01); *H04N 21/4223* (2013.01); *H04N 21/44008* (2013.01)
USPC .......................................... 725/115; 725/134

(58) Field of Classification Search
CPC ............. H04N 21/2181; H04N 21/222; H04L 29/08549
USPC ................................................. 725/115, 134
See application file for complete search history.

(56) References Cited

U.S. PATENT DOCUMENTS 6,638,113 B2   10/2003   Kajiwara et al.
7,039,393 B1    5/2006   Kite (Continued)

FOREIGN PATENT DOCUMENTS

EP          1814290 A2      8/2007
WO     WO 2014/093931 A1   6/2014

(Continued)

OTHER PUBLICATIONS

Amazon, Amazon CloudFront Documentation, 3 pages, Available at: http://aws.amazon.com/documentation/cloudfront/; Accessed on Feb. 25, 2014.

(Continued)

*Primary Examiner* — Pankaj Kumar
*Assistant Examiner* — Franklin Andramuno
(74) *Attorney, Agent, or Firm* — Swanson & Bratschun, L.L.C.

(57) ABSTRACT

Novel tools and techniques for implementing distributed infrastructure are provided. In some techniques, a plurality of user devices, each at a customer premises, can provide video calling services over a network. In some embodiments, each of one or more user devices might be established as a distributed infrastructure element for cloud computing, cloud-based application hosting, and/or cloud-based data storage. One or more software applications, customer data, and/or media content (collectively, "hosted content") might be provided to the one or more user devices for hosting thereon. Resource usage information and/or network connectivity information might be collected for each user device, and suitability of a user device to host the hosted content might be determined based at least in part on the collected resource usage information and/or network connectivity information. One or more courses of action may be determined, and invoked, based on performance metrics of the user devices.

29 Claims, 5 Drawing Sheets

(56) References Cited

U.S. PATENT DOCUMENTS

| | | | |
|---|---|---|---|
| 7,587,289 | B1 | 9/2009 | Sivertsen |
| 7,768,388 | B2 | 8/2010 | Putterman et al. |
| 8,063,929 | B2 | 11/2011 | Kurtz et al. |
| 8,122,491 | B2 | 2/2012 | Yee et al. |
| 8,144,182 | B2 | 3/2012 | Shoemake et al. |
| 8,325,213 | B2 | 12/2012 | Lamb et al. |
| 8,330,795 | B2 | 12/2012 | Iyer et al. |
| 8,366,487 | B2 | 2/2013 | Weng et al. |
| 8,566,838 | B2 * | 10/2013 | Sabin et al. ............... 718/105 |
| 2001/0032246 | A1 | 10/2001 | Fardella et al. |
| 2003/0200105 | A1 | 10/2003 | Borden, IV et al. |
| 2004/0027624 | A1 | 2/2004 | Parulski et al. |
| 2004/0114919 | A1 | 6/2004 | Rife |
| 2004/0145658 | A1 | 7/2004 | Lev-Ran et al. |
| 2005/0096084 | A1 | 5/2005 | Pohja et al. |
| 2005/0246738 | A1 | 11/2005 | Lockett et al. |
| 2005/0283813 | A1 | 12/2005 | Jamail et al. |
| 2006/0107281 | A1 | 5/2006 | Dunton |
| 2006/0268149 | A1 | 11/2006 | Teng |
| 2007/0067407 | A1 | 3/2007 | Bettis et al. |
| 2007/0188597 | A1 | 8/2007 | Kenoyer |
| 2008/0028318 | A1 | 1/2008 | Shikuma |
| 2008/0062253 | A1 | 3/2008 | Jaspersohn et al. |
| 2008/0152096 | A1 | 6/2008 | Archer |
| 2008/0189617 | A1 | 8/2008 | Covell et al. |
| 2008/0270589 | A1 | 10/2008 | Hwang |
| 2008/0292139 | A1 | 11/2008 | Wadhwa et al. |
| 2008/0307105 | A1 | 12/2008 | Sethi et al. |
| 2010/0060477 | A1 | 3/2010 | Laasik et al. |
| 2010/0064334 | A1 | 3/2010 | Blackburn et al. |
| 2010/0169410 | A1 | 7/2010 | Lund et al. |
| 2010/0218170 | A1 * | 8/2010 | MacLellan et al. ............ 717/127 |
| 2010/0220188 | A1 | 9/2010 | Renkis |
| 2010/0306379 | A1 * | 12/2010 | Ferris ............................ 709/226 |
| 2011/0029370 | A1 | 2/2011 | Roeding et al. |
| 2011/0035271 | A1 | 2/2011 | Weaver et al. |
| 2011/0069179 | A1 | 3/2011 | Bathiche et al. |
| 2011/0075011 | A1 | 3/2011 | Abebe |
| 2011/0211678 | A1 | 9/2011 | Woodworth et al. |
| 2011/0317587 | A1 * | 12/2011 | Lida et al. ..................... 370/254 |
| 2012/0002849 | A1 | 1/2012 | Tokuse |
| 2012/0133515 | A1 | 5/2012 | Palshof |
| 2012/0166517 | A1 | 6/2012 | Lee et al. |
| 2012/0203823 | A1 | 8/2012 | Manglik et al. |
| 2012/0226752 | A1 | 9/2012 | Jeong et al. |
| 2012/0236127 | A1 | 9/2012 | Ojala et al. |
| 2012/0266252 | A1 * | 10/2012 | Spiers et al. ..................... 726/26 |
| 2012/0315793 | A1 | 12/2012 | Hermann et al. |
| 2012/0331113 | A1 * | 12/2012 | Jain et al. ..................... 709/220 |
| 2013/0046280 | A1 | 2/2013 | Martin et al. |
| 2013/0083150 | A1 | 4/2013 | Howarter et al. |
| 2013/0265384 | A1 | 10/2013 | Shoemake et al. |
| 2013/0344961 | A1 * | 12/2013 | Iannetta .......................... 463/36 |
| 2014/0168071 | A1 | 6/2014 | Ahmed et al. |
| 2014/0168344 | A1 | 6/2014 | Shoemake et al. |
| 2014/0168453 | A1 | 6/2014 | Shoemake et al. |

FOREIGN PATENT DOCUMENTS

| | | | |
|---|---|---|---|
| WO | WO 2014/093932 A1 | 6/2014 | |
| WO | WO 2014/093933 A1 | 6/2014 | |
| WO | WO 2014/121148 A1 | 8/2014 | |

OTHER PUBLICATIONS

Amazon, Amazon Simple Storage Service Getting Started Guide (Mar. 1, 2006), 20 pages, Amazon Web Services LLC.

Varia et al., Overview of Amazon Web Services (Jan. 2014), 22 pages, Amazon Web Services.

Anderson, SETI@home: An Experiment in Public-Resource Computing (Nov. 2002), 8 pages, Space Sciences Laboratory, U.C. Berkeley.

Apple, Apple TV 3$^{rd}$ Generation Setup Guide, 36 pages.

Data Center Virtualization and Cloud Infrastructure Products, 5 pages, Available at: http://www.vmware.com/products/datacenter-virtualization/, Accessed on Feb. 25, 2014.

Dropbox Review and Rating, 12 pages, Available at: http://www.pcmag.com/article2/0,2817,2343852,00.asp, Accessed on Feb. 25, 2014.

Nest, Learning Thermostat™ User Guide, 8 pages.

Nygren, The Akamai Network: A Platform for High-Performance Internet Applications, 18 pages, Akamai Technologies, Cambridge, US.

Oracle VM VirtualBox, 2 pages, Available at: https://www.virtualbox.org/, Accessed on Feb. 25, 2014.

Qemu, Open Source Processor Emulator, 2 pages, Available at: http://wiki.qemu.org/Main_Page, Accessed on Mar. 4, 2014.

Roku, User Guide (2008-2009), 51 pages,Roku, Inc.

Linux Foundation, Why the Xen Project?, 5 pages, Available at: http://www.xenproject.org/users/why-the-xen-project.html, Accessed on Feb. 25, 2014.

Softlayer Services®, 2 pages, Available at: http://www.softlayer.com/services/storagelayer, Accessed on Mar. 4, 2014.

Wikipedia, the free encyclopedia, Apache HTTP Server, 5 pages, Available at: http://en.wikipedia.org/wiki/Apache_HTTP_Server, Accessed on Feb. 26, 2014.

Wikipedia, the free encyclopedia, cPanel, 4 pages, Available at: http://en.wikipedia.org/wiki/CPanel, Accessed on Feb. 26, 2014.

Wikipedia, the free encyclopedia, Distributed computing, 12 pages, Available at: http://en.wikipedia.org/wiki/Distributed_computing, Accessed on Feb. 26, 2014.

Wikipedia, the free encyclopedia, Grid computing, 12 pages, Available at: http://en.wikipedia.org/wiki/Grid_computing, Accessed on Feb. 26, 2014.

Wikipedia, the free encyclopedia, PlayStation 4, 21 pages, Available at: http://en.wikipedia.org/wiki/PlayStation_4, Accessed on Feb. 25, 2014.

Wikipedia, the free encyclopedia, Wii, 30 pages, Available at: http://en.wikipedia.org/wiki/Wii, Accessed on Feb. 25, 2014.

Wikipedia, the free encyclopedia, Wolfram Alpha, 6 pages, Available at: http://en.wikipedia.org/wiki/Wolfram_Alpha, Accessed on Feb. 25, 2014.

Wikipedia, the free encyclopedia, Xbox One, 16 pages, Available at: http://en.wikipedia.org/wiki/Xbox_one, Accessed on Feb. 25, 2014.

AWS, Amazon Elastic Compute Cloud (EC2), Amazon Web Services LLC, 6 pages, Available at: http://aws.amazon.com/ec2/; Accessed on Mar. 3, 2014.

AWS, Amazon Simple Storage Service, Amazon Web Services, Inc., 6 pages, Available at: http://aws.amazon.com/s3/; Accessed on Mar. 3, 2014.

Apple, "iOS 8 FaceTime" video calling service; Available at: http://www.apple.com/ios/facetime/; Accessed on Oct. 2, 2014; 3 pages.

Apple "iPhoto for Mac" 6 pages, Available at: https://www.apple.com/mac/iphoto/; Accessed on Feb. 28, 2014.

Apple "OS X Mavericks, Mac App Store" 5 pages, Available at: http://www.apple.com/osx/apps/app-store.html; Accessed on Feb. 28, 2014.

Biscotti camera products; Available at: http://biscotti.com/biscotti; Accessed on Oct. 2, 2014; 1 page.

Blue Host, "The Best Web Hosting", Available at: http://www.bluehost.com/; Accessed on Oct. 2, 2014; 3 pages.

BlueJeans Network; Multi-Party Conferencing in the Cloud; Available at: http://www.bluejeans.com; Accessed on Oct. 2, 2014; 3 pages.

Cerf et al. (1974) "Specification of Internet Transmission Control Program" Network Working Group; 70 pages.

Cisco Collaboration Endpoints; Video calling cameras and systems; Available at: http://www.cisco.com/c/en/us/products/collaboration-endpoints/product-listing.html; Accessed on Oct. 2, 2014; 2 pages.

DECT "Part 6: Identities and addressing" (Feb. 1998) European Standard (Telecommunications series); 41 pages.

Domain Discover.US "Put Yourself on the Web"; Available at: https://www.tierra.net/domains; 3 pages.

Fielding et al. (1999) "Hypertext Transfer Protocol—HTTP/1.1" Network Working Group; 114 pages.

(56) References Cited

OTHER PUBLICATIONS

Google website; Available at: https://www.google.com/; Accessed on Oct. 2, 2014; 1 page.
Google "Google Apps for Business" 2 pages, Available at: http://www.google.com/enterprise/apps/business/, Accessed on Feb. 28, 2014.
Google "Google Play" 3 pages, Available at: https://play.google.com/store?hl=en, Accessed on Feb. 28, 2014.
HD Wi-Fi video monitoring cameras for iPhone, Android or computer; Dropcam, Inc., Available at: http://web.archive.org/web/20121213184724/https://www.dropcam.com/; Accessed on Feb. 28, 2014, 3 pages.
Information Sciences Institute (1981) "Internet Protocol"; Available at: http://www.ietf.org/rfc/rfc791.txt; Accessed on Oct. 2, 2014; 48 pages.
International Telecommunication Union; E.164: The international public telecommunication numbering plan; Available at: http://www.itu.int/rec/T-REC-E.164/en; Accessed on Oct. 2, 2014; 1 page.
International Telecommunication Union; G.711: Pulse code modulation (PCM) of voice frequencies; Available at: http://www.itu.int/rec/T-REC-G.711; Accessed on Oct. 2, 2014; 1 page.
International Telecommunication Union; G.722: 7kHz audio-coding within 64 kbit/s; Available at: http://www.itu.int/rec/T-REC-G.722; Accessed on Oct. 2, 2014; 1 page.
IP Version 6 Working Group (ipv6); Available at: http://datatracker.ietf.org/wg/ipv6/charter/; Accessed on Oct. 2, 2014; 3 pages.
ITU-T (2007) "H.264 Series H: Audiovisual and Multimedia Systems"; 564 pages.
Johnny Chung Lee Projects—Wii www.johnnylee.net/projects/wii/ Accessed on Sep. 5, 2013, 3 pages.
Lifesize; Video Conference Systems and Accessories; Available at: http://www.lifesize.com/en/products/video-conferencing-systems-and-accessories; Accessed on Oct. 2, 2014; 11 pages.
Logitech Business Webcams; Available at: http://www.logitech.com/en-us/for-business/products/webcams; Accessed on Oct. 2, 2014; 4 pages.
Ludwig, XEP-0166: Jingle; Available at: http://xmpp.org/extensions/xep-0166.html; Accessed on Oct. 2, 2014; 49 pages.
Mahy et al. (2010) Traversal Using Relays around NAT (TURN): Relay Extensions to Session Traversal Utilities for NAT (STUN); Available at: http://tools.ietf.org/html/rfc5766; Accessed on Oct. 2, 2014; 134 pages.
Microsoft, Xbox Games and Entertainment on All Your Devices; Available at: http://www.xbox.com/en-US/#fbid=_oRvaiAGfk1; Accessed on Oct. 2, 2014; 2 pages.
Netflix "Watch TV Shows Online, Watch Movies Online"; Available at: https://www.netflix.com/?locale=en-US; Accessed on Feb. 28, 2014; 1 page.
Nielson People Meters; Available at: http://www.nielsen.com/content/corporate/us/en/solutions/measurement/television.html Accessed on Oct. 2, 2014; 4 pages.
Notification Concerning Availability of Publication of the International Application; PCT Patent Application No. PCT/US2013/075184; mailed Jun. 19, 2014; 1 page.
Notification Concerning Availability of Publication of the International Application; PCT Patent Application No. PCT/US2013/075185; mailed Jun. 19, 2014; 1 page.
Notification Concerning Availability of Publication of the International Application; PCT Patent Application No. PCT/US2013/075186; mailed Jun. 19, 2014; 1 page.
Notification Concerning Availability of Publication of the International Application; PCT Patent Application No. PCT/US2014/014321; mailed Aug. 7, 2014; 1 page.
Notification of Transmittal of the International Search Report and the Written Opinion of the International Searching Authority, or the Declaration for PCT International Application No. PCT/US13/075184; mailed May 13, 2014; 15 pages.
Notification of Transmittal of the International Search Report and the Written Opinion of the International Searching Authority, or the Declaration for PCT International Application No. PCT/US13/075185; mailed Apr. 7, 2014; 12 pages.
Notification of Transmittal of the International Search Report and the Written Opinion of the International Searching Authority, or the Declaration for PCT International Application No. PCT/US13/75186; mailed May 1, 2014; 11 pages.
Notification of Transmittal of the International Search Report and the Written Opinion of the International Searching Authority, or the Declaration for PCT International Application No. PCT/US14/14321; mailed May 9, 2014; 18 pages.
Panasonic (2011) Operating Instructions: KX-TG9471 and KX-TG9472; 64 pages.
Pantos et al. (2013) "HTTP Live Streaming"; Available at: http://tools.ietf.org/html/draft-pantos-http-live-streaming-11; Accessed on Oct. 2, 2014; 74 pages.
Polycom Data Sheet; Polycom® VoiceStation® 300 "Crystal-clear conferencing for smaller rooms and desktops"; 2013 Polycom, Inc.; 2 pages.
Polycom; Polycom HDX Series Product Brochure; Available at: http://www.polycom.com/content/dam/polycom/common/documents/brochures/hdx-family-br-enus.pdf; Accessed on Oct. 2, 2014; 4 pages.
Polycom User Guide; VoiceStation™ 300; Polycom, Inc.; http://www.polycom.com; 17 pages.
Postel (1982) "Simple Mail Transfer Protocol" Info Sciences Institute, USC; 71 pages.
Rosenberg (2010) "Interactive Connectivity Establishment (ICE): A Protocol for Network Address Translator (NAT) Traversal for Offer/Answer Protocols"; Available at: http://tools.ietf.org/html/rfc5245; Accessed on Oct. 12, 2014; 234 pages.
Rosenberg et al. "Session Traversal Utilities for NAT (STUN)"; Available at: http://tools.ietf.org/html/rfc5389; Accessed on Oct. 12, 2014; 102 pages.
Rosenberg, et al. (2002) "SIP: Session Initiation Protocol" http://www.ietf.org/rfc/rfc3261.txt; Accessed on Jun. 27, 2014; 265 pages.
Rosenberg "Simple Made Simple: An Overview of the IETF Specifications for Instant Messaging and Presence Using the Session Initiation Protocol (SIP)" (Apr. 2013) Available at: https://tools.ietf.org/html/rfc6914, Accessed on Feb. 28, 2014.
Saint-Andre, "Extensible Messaging and Presence Protocol (XMPP): Core, Jabber Software Foundation" (Oct. 2004) 73 pages, Available at: http://xmpp.org/rfcs/rfc3920.html, Accessed on Feb. 28, 2014.
Skype video calling service; Available at: www.skype.com/en/; Accessed on Oct. 2, 2014; 4 pages.
SPEEX: A Free Codec for Free Speech; Available at: http://www.speex.org; Accessed on Oct. 12, 2014; 2 pages.
U.S. Appl. No. 12/561,165; Notice of Allowance dated Feb. 2, 2012; 12 pages.
U.S. Appl. No. 13/857,736; Notice of Publication dated Oct. 10, 2013; 1 page.
U.S. Appl. No. 13/857,736; Ex Parte Quayle Office Action dated Sep. 16, 2014; 8 pages.
U.S. Appl. No. 14/106,263; NonFinal Office Action dated Mar. 6, 2014; 20 pages.
U.S. Appl. No. 14/106,263; Final Office Action dated Jun. 13, 2014; 21 pages.
U.S. Appl. No. 14/106,263; Notice of Publication dated Jun. 19, 2014; 1 page.
U.S. Appl. No. 14/106,279; NonFinal Office Action dated Feb. 28, 2014; 16 pages.
U.S. Appl. No. 14/106,279; Notice of Publication dated Jun. 19, 2014; 1 page.
U.S. Appl. No. 14/106,279; Final Office Action dated Jul. 22, 2014; 17 pages.
U.S. Appl. No. 14/170,499; Notice of Publication dated Jun. 19, 2014; 1 page.
U.S. Appl. No. 14/170,499, NonFinal Office Action dated Jul. 18, 2014; 19 pages.
U.S. Appl. No. 14/341,009, filed Jul. 25, 2014; 89 pages.
U.S. Appl. No. 14/464,435, filed Aug. 20, 2014; 111 pages.
U.S. Appl. No. 14/472,133, filed Aug. 28, 2014; 123 pages.
U.S. Appl. No. 14/479,169, filed Sep. 5, 2014; 99 pages.

(56) References Cited

OTHER PUBLICATIONS

Variable Frame Rate MP4; https://kb.speeddemosarchive.com/Variable_Frame_Rate_MP4; Accessed on Jun. 27, 2014; 3 pages.
Vidyo, "The Vidyo Experience"; Available at: http://www.vidyo.com/products/use/; Accessed on Oct. 2, 2014; 5 pages.
WebRTC; Available at: http://www.webrtc.org; Accessed on Oct. 2, 2014; 4 pages.
WebSocket.org, Are you plugged in?; "What is WebSocket?"; Available at: http://www.websocket.org; Accessed on Oct. 2, 2014; Kaazing Corporation; 1 page.
Wikipedia, the free encyclopedia; "Audio to Video Synchronization" Available at: http://en.wikipedia.org/wiki/Audio_to_video_synchronization; Accessed on Jun. 27, 2014; 6 pages.
Wikipedia, the free encyclopedia; "Cloud computing" Available at: en.wikipedia.org/wiki/Cloud_computing; Retrieved Mar. 3, 2014; 34 pages.
Wikipedia, the free encyclopedia; "Cloud storage" Available at: en.wikipedia.org/wiki/Cloud-storage; Retrieved Mar. 3, 2014; 5 pages.
Wikipedia, the free encyclopedia; "Email" Available at: en.wikipedia.org/wiki/Email; Retrieved Mar. 3, 2014; 25 pages.
Wikipedia, the free encyclopedia; "Face Detection" Available at: http://en.wikipedia.org/wiki/Face_detection; Accessed on Feb. 28, 2014; 2 pages.
Wikipedia, the free encyclopedia; "Face Recognition System" Available at: http://en.wikipedia.org/wiki/Facial_recognition_system; Accessed on Feb. 28, 2014; 10 pages.
Wikipedia, the free encyclopedia; "Hypertext Transfer Protocol" Available at: en.wikipedia.org/wiki/Http; Retrieved Mar. 3, 2014; 10 pages.
Wikipedia, the free encyclopedia; "MPEG-4 Part 14" container format; Available at: http://en.wikipedia.org/wiki/MPEG-4; Accessed on Jun. 27, 2014; 4 pages.
Wikipedia, the free encyclopedia; "Session Initiation Protocol" Available at: http://en.wikipedia.org/wiki/Session_Initiation_Protocol; Accessed Jun. 27, 2014; 6 pages.
Wikipedia, the free encyclopedia "Simple" en.wikipedia.org/wiki/SIMPLE, retrieved Mar. 3, 2014, 3 pages.
Wikipedia, the free encyclopedia; "Speech Recognition" Available at: http://en.wikipedia.org/wiki/Speech_recognition; Accessed on Feb. 28, 2014; 14 pages.
Wikipedia, the free encyclopedia; "Time-lapse photography" Available at en.wikipedia.org/wiki/ Time-lapse_photography; Retrieved Mar. 3, 2014; 11 pages.
Wikipedia, the free encyclopedia; "Transmission Control Protocol" Available at: en.wikipedia.org/wiki/Transmission_Control_Protocol; Retrieved Mar. 3, 2014; 19 pages.
Wikipedia, the free encyclopedia; "VP8" Available at: http://en.wikipedia.org/wiki/VP8; Retrieved Oct. 12, 2014; 8 pages.
Wikipedia, the free encyclopedia; "XMPP" Available at: en.wikipedia.org/wiki/XMPP; Retrieved Mar. 3, 2014; 10 pages.
XMPP Standards Foundation; Available at: http://xmpp.org/xmpp-protocols/; Accessed on Oct. 2, 2014; 1 page.
Young (1998) "FundamentalsImageProcessing," 113 pages.
Zoom Video Communications, Inc.; Zoom Cloud Video Conferencing; Available at: http://www.zoom.us; Accessed on Oct. 2, 2014; 2 pages.

\* cited by examiner

DISTRIBUTED INFRASTRUCTURE

CROSS-REFERENCES TO RELATED APPLICATIONS

This application claims the benefit, under 35 U.S.C. §119 (e), of the following applications: provisional U.S. Patent Application No. 61/877,928, filed Sep. 13, 2013 by Ahmed et al. and titled "Mobile Presence Detection"; provisional U.S. Patent Application No. 61/874,903, filed Sep. 6, 2013 by Shoemake et al. and titled "Virtual Window"; provisional U.S. Patent Application No. 61/872,603, filed Aug. 30, 2013 by Shoemake et al. and titled "Physical Presence and Advertising"; provisional U.S. Patent Application No. 61/858,518, filed Jul. 25, 2013 by Shoemake et al. and titled "Video Calling and Conferencing Advertising"; provisional U.S. Patent Application No. 61/759,621, filed Feb. 1, 2013 by Shoemake et al. and titled "Video Mail Capture, Processing and Distribution"; and provisional U.S. Patent Application No. 61/737,506, filed Dec. 14, 2012 by Shoemake et al. and titled "Video Capture, Processing and Distribution System". This application may also be related to U.S. patent application Ser. No. 14/106,279, filed on a date even herewith by Ahmed et al. and titled "Mobile Presence Detection"and to U.S. patent application Ser. No. 14/106,263, filed on a date even herewith by Ahmed et al. and titled "Video Capture, Processing and Distribution".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for establishing, operating, and/or maintaining distributed infrastructure for cloud computing, cloud-based application hosting, and/or cloud-based data storage, and more particularly to tools and techniques for establishing, operating, and/or maintaining distributed infrastructure for cloud computing, cloud-based application hosting, and/or cloud-based data storage using a plurality of user devices linked over a network.

BACKGROUND

The proliferation of capable user devices, pervasive communication, and increased bandwidth has provided opportunity for many enhanced services for users. One example is video calling. Once the domain of high-end, dedicated systems from vendors such as POLYCOM®, video calling has become available to the average consumer at a reasonable cost. For example, the Biscotti™ device, available from Biscotti Inc., provides an inexpensive tool to allow video calling using a high-definition television and an Internet connection. Such devices present a powerful platform for various applications. Examples include, without limitation, video calling, instant messaging, presence detection, status updates, media streaming over the Internet, web content viewing, gaming, and DVR capability. Another example of such value added services is the introduction of online gaming. Rather than playing a game by him- or herself, a user now can play most games in a multiplayer mode, using communication over the Internet or another network.

Enabling such services is a new class of user device, which generally features relatively high-end processing capability (which would have been unthinkable outside supercomputing labs just a few years ago), substantial random access memory, and relatively vast storage capabilities, including hard drives, solid-state drives, and the like. Such user devices can include, without limitation, the video calling devices mentioned above, the presence detection devices ("PDDs") described in the Mobile Presence Detection Application various video game consoles, and the like. Such devices generally have a reliable, and relatively high-speed, connection to the Internet (to enable the value added services) and significant amounts of downtime, in which the processing and other capabilities of the devices are unused.

Historically, in the cloud computing space, infrastructure used for cloud computing and cloud storage has been hosted in large data centers that contain many general purpose and/or special purpose computers. Similarly, hosted applications such as web hosting, e-mail hosting, file transfer protocol ("FTP") functionality, and/or other services are typically hosted from a centralized data center. Such services may require storage, computation, and network connectivity. Such services may also include computational services. These services require establishing, operating, and maintaining such facilities, as well as the networking infrastructure required to implement distributed computing or distributed data storage or the like, all of which may add to the cost of the resultant cloud services. Further, hosting providers typically host applications for many different entities from a small number of locations, making the entire system susceptible to losses to a significant portion of the services in the case that one or more of the number of locations experience system crashes, perhaps due to events, including, without limitation, sudden high demand, natural or man-made disasters, local/regional power grid issues, and/or the like. Finally, Content Delivery Networks, which replicate and cache data closer to the users, typically use a limited number of peering locations that cache content closer to users, which may result in data congestion—and thus long data transmission times.

Hence, there is a need for more robust and scalable distributed infrastructure solutions, and some such solutions can employ the powerful user devices already resident in many users' homes.

BRIEF SUMMARY

A set of embodiments provides tools and techniques for establishing, operating, and/or maintaining, or otherwise implementing, distributed infrastructure for cloud computing, cloud-based application hosting, and/or cloud-based data storage, e.g., by using a plurality of user devices linked over a network.

Some embodiments can employ data processing, random access memory, sensor input, and/or data storage capacity inherent to advanced user devices, which when connected to a network (for example, to provide video calling services, multiplayer gaming, etc.), can be linked to serve as distributed infrastructure for cloud computing, cloud-based application hosting, and/or cloud-based data storage. With each such user device installed within customer premises, existing networking components and equipment for the customer's Internet connectivity needs may be used, with no additional networking infrastructure being necessary. Further, such user devices, in some embodiments, may be low-profile, "plug-and-play" devices; as such, any costs (if any) for connecting such user devices to the network (additional to existing network connectivity at the customer premises) are minimal or negligible, and the standardized platforms of such user devices provide a reliable platform to ease in configuration and resource allocation among the distributed infrastructure As more and more such user devices are added to the network (i.e., as more consumers purchase devices to participate in video calling services, content delivery services, gaming services, and/or the like), the capacity of the distributed infrastructure may expand. With each successive version of the hardware for each type of user device, processing power and data storage capacity per device also increases. All combined, an ever expanding, low maintenance, low cost implementation of a distributed infrastructure may be established, operated, and/or maintained concurrent with the user devices' primary function of enabling high-definition, plug-and-play video calling services, contend delivery services, gaming services, and/or the like.

The tools provided by various embodiments include, without limitation, methods, systems, and/or software products. Merely by way of example, a method might comprise one or more procedures, any or all of which are executed by a user device and/or a computer system. Correspondingly, an embodiment might provide a user device and/or a computer system configured with instructions to perform one or more procedures in accordance with methods provided by various other embodiments. Similarly, a computer program might comprise a set of instructions that are executable by a user device and/or a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method might comprise communicatively coupling a plurality of user devices together in a network, each of the plurality of user devices being located in one of a plurality of customer premises. Each user device might comprise (but need not necessarily include) a video input interface to receive video input from a local content source (which, in some embodiments, might include a set-top box ("STB") and/or the like), an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and a storage medium in communication with the at least one processor. The method might further comprise establishing, with a computer, one or more user devices of the plurality of user devices as distributed infrastructure elements. In some instances, the method might comprise providing, with the computer, at least one of one or more software applications, customer data, or media content to the one or more user devices for hosting on the one or more user devices.

In some embodiments, each of the plurality of user devices might adhere to one of a limited number of classes of hardware. Each class of hardware might have a known, common hardware configuration. In such embodiments, the method might further comprise determining, with the computer, a class of each of the plurality of user devices, and determining, with the computer, capabilities of each user device, based on the determined class of each user device. In some instances, providing the at least one of one or more software applications, customer data, or media content to the one or more user devices might comprise providing the least one of one or more software applications, customer data, or media content to the one or more user devices based at least in part on the determined capabilities of each user device.

In some cases, the computer might be at least one of the plurality of user devices, and, in some instances, the computer might be at least one of the one or more user devices that are established as distributed infrastructure elements. Alternatively, or in addition, the computer might be a control server in communication with the plurality of user devices over the network.

According to some embodiments, the method might further comprise determining, with the computer, a redundancy level for hosting each of the at least one of the one or more software applications, the customer data, or the media content across the one or more user devices. In some instances, providing the at least one of one or more software applications, customer data, or media content to the one or more user devices for hosting on the one or more user devices might comprise providing, with the computer, the at least one of one or more software applications, customer data, or media content to the one or more user devices, based at least in part on the determined redundancy level for hosting each of the at least one of the one or more software applications, the customer data, or the media content across the one or more user devices.

In some embodiments, the method might further comprise collecting, with the computer, resource usage information for each of the one or more user devices, and collecting, with the computer, network connectivity information for each of the one or more user devices. In some cases, the method might comprise determining, with the computer, suitability of each of the one or more user devices to host the at least one of one or more software applications, customer data, or media content, based at least in part on one or more of the collected resource usage information or the collected network connectivity information.

Merely by way of example, in some instances, the method might further comprise receiving, with the computer, user input from a user among a plurality of users indicating what type of software applications, customer data, or media content are permitted to be hosted on a user device owned by the user. The method might also comprise receiving, with the computer, user input from the user indicating at least one of a level of processing power or a level of storage on the user device owned by the user that is permitted for hosting the indicated type of software applications, customer data, or media content. In some instances, the method might comprise labelling, with the computer, each of the one or more user devices with at least one of a first label or a second label. The first label indicates type of distributed hosting, based on the indicated type of software applications, customer data, or media content, while the second label indicates capacity of distributed hosting, based on the at least one of the indicated level of processing power or the indicated level of storage. According to some embodiments, the method might further comprise determining, with the computer, suitability of each of the one or more user devices to host the at least one of one or more software applications, customer data, or media content, based at least in part on one or more of the first label or the second label. In some cases, providing the at least one of one or more software applications, customer data, or media content to the one or more user devices for hosting on the one or more user devices might comprise providing, with the computer, the at least one of one or more software applications, customer data, or media content to the one or more user devices, based at least in part on at least one of the first label, the second label, or the determined suitability of each of the one or more user devices to host the at least one of one or more software applications, customer data, or media content.

In some embodiments, establishing the one or more user devices of the plurality of user devices as distributed infrastructure elements might comprise installing, with the computer, software on at least two user devices of the one or more user devices to enable distributed processing of software applications across the at least two user devices. In some instances, establishing the one or more user devices of the plurality of user devices as distributed infrastructure elements might comprise installing, with the computer, software on at least two user devices of the one or more user devices to enable hosting of software applications across the at least two user devices. In alternative, or additional, embodiments, establishing the one or more user devices of the plurality of user devices as distributed infrastructure elements might comprise installing, with the computer, software on at least two user devices of the one or more user devices to enable distributed storage of one or more of customer data or media content across the at least two user devices.

In some instances, providing the at least one of one or more software applications, customer data, or media content to the one or more user devices for hosting on the one or more user devices might comprise providing, with the computer, mirrored copies of the at least one of one or more software applications, customer data, or media content to each of at least two user devices of the one or more user devices. Alternatively, or in addition, providing the at least one of one or more software applications, customer data, or media content to the one or more user devices for hosting on the one or more user devices might comprise providing, with the computer, portions of each of the at least one of one or more software applications, customer data, or media content to each of at least two user devices of the one or more user devices.

According to some aspects, the method might further comprise monitoring, with the computer, one or more of performance of at least one user device of the one or more user devices, or performance of the distributed infrastructure elements, as a whole. In some cases, the method might comprise determining, with the computer, one or more courses of action to invoke, based at least in part on one or more of performance metrics of the at least one user device, or performance metrics of the distributed infrastructure elements, as a whole. The method might further comprise invoking, with the computer, the one or more courses of action, based on said determination.

In some embodiments, the method might further comprise monitoring, with the computer, usage of a user device owned by a user, among the one or more user devices, as a distributed infrastructure element, over a first period. The method might also comprise determining, with the computer, compensation to the user for use of the user device owned by the user as a distributed infrastructure element, over the first period.

In another aspect, a user device among a plurality of user devices might comprise a video input interface to receive video input from a local content source, an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and/or a storage medium in communication with the at least one processor. The network interface might, in some instances, be configured to communicate with at least one other user device among the one or more user devices over a network. The storage medium might have encoded thereon a set of instructions executable by the at least one processor to control operation of the user device.

The set of instructions might comprise instructions to establish one or more other user devices of the plurality of user devices as distributed infrastructure elements. The set of instructions might further comprise instructions to provide at least one of one or more software applications, customer data, or media content to the one or more other user devices for hosting on the one or more other user devices.

In yet another aspect, a user device might comprise a video input interface to receive video input from a local content source, an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and/or a storage medium in communication with the at least one processor. The network interface might, in some instances, be configured to communicate with the computer and at least one other user device among one or more user devices over a network. The storage medium might have encoded thereon a set of instructions executable by the at least one processor to control operation of the user device.

The set of instructions might comprise instructions to receive, from a computer, instructions to reconfigure to become a distributed infrastructure element of a distributed infrastructure, and instructions to reconfigure into a distributed infrastructure element, based on the instructions received from the computer. The set of instructions might further comprise instructions to receive at least one of one or more software applications, customer data, or media content provided from the computer, and instructions to host the at least one of one or more software applications, customer data, or media content within the distributed infrastructure.

In still another aspect, a system might comprise a computer, and one or more user devices. The computer might comprise at least one first processor and a first storage medium in communication with the at least one first processor. The first storage medium might have encoded thereon a first set of instructions executable by the at least one first processor to control operation of the one or more user devices of a plurality of user devices. The first set of instructions might comprise instructions to establish the one or more user devices as distributed infrastructure elements, and instructions to provide at least one of one or more software applications, customer data, or media content to the one or more user devices for hosting on the one or more user devices.

Each of the one or more user devices might comprise a video input interface to receive video input from a local content source, an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one second processor, and/or a second storage medium in communication with the at least one second processor. The network interface might, in some instances, be configured to communicate with at least one of the computer over a network or at least one other user device among the one or more user devices over the network. The second storage medium might have encoded thereon a second set of instructions executable by the at least one second processor to control operation of the user device.

The second set of instructions might comprise instructions to receive, from the computer, instructions to reconfigure to become a distributed infrastructure element of a distributed infrastructure, and instructions to reconfigure into a distributed infrastructure element, based on the instructions received from the computer. The second set of instructions might further comprise instructions to receive the at least one of one or more software applications, customer data, or media content provided from the computer, and instructions to host the at least one of one or more software applications, customer data, or media content within the distributed infrastructure.

In some cases, the computer might be at least one of the plurality of user devices, and, in some instances, the computer might be at least one of the one or more user devices that are established as distributed infrastructure elements. Alternatively, or in addition, the computer might be a control server in communication with the one or more user devices over the network.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
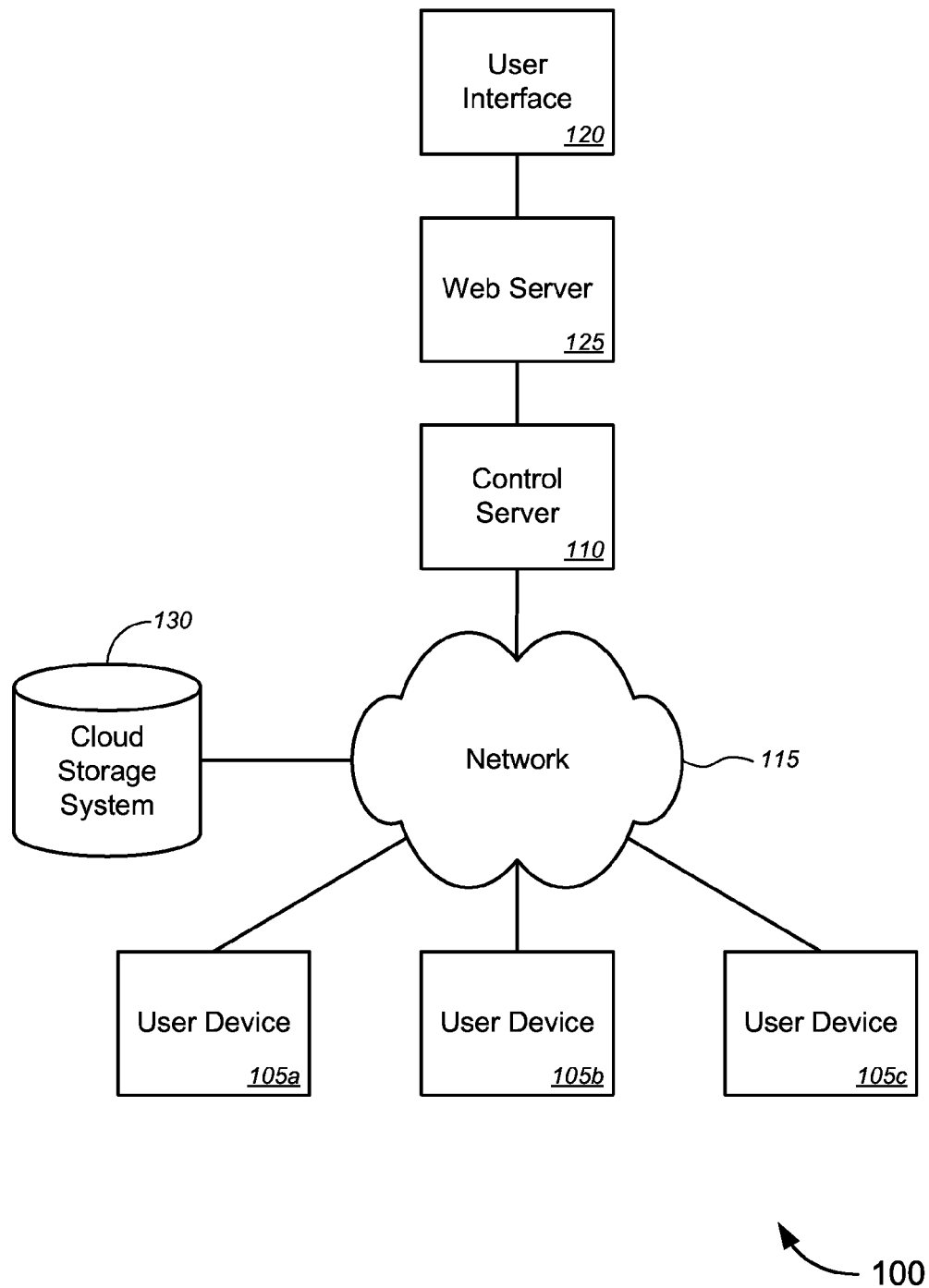
FIG. 1 is a block diagram illustrating a system for implementing distributed infrastructure for cloud computing, cloud-based application hosting, and/or cloud-based data storage, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Features Provided by Various Embodiments

User devices provided by various embodiments can contain, inter alia, cameras, microphones, and/or other sensors (including, without limitation, infrared ("IR") sensors). These sensors, in conjunction with the internal processing capability of the device, can allow the device to detect when a person is in the room. Additionally, through means such as facial recognition and voice detection, or the like, the devices also can automatically recognize who is in the room. More specifically, such devices can detect the presence of a particular individual.

In various embodiments, each of a plurality of user devices can simultaneously connect to a display device (e.g., a television ("TV")) and a local content source (which can include, without limitation, a cable set-top box ("STB"), a satellite STB, an Internet Protocol television ("IPTV") STB, and/or the like) in a passthrough configuration. In other words, such a user device is located functionally inline between the display device and the local content source. When situated functionally inline between a local content source and a display device, the user device can receive an audiovisual stream output from the local content source, modify that audiovisual stream in accordance with the methods described herein and in, e.g., U.S. patent application Ser. No. 12/561,165, filed Sep. 16, 2009 by Shoemake et al. and titled "Real Time Video Communications System" (issued as U.S. Pat. No. 8,144,182 and referred to herein as the "'182 patent," the disclosure of which is hereby incorporated herein by reference), and provide the (perhaps modified) audiovisual stream as input to the display device. In this manner, such a user device may function in a similar manner as the video communication device ("VCD") described in detail in the '182 patent.

User devices, in some instances, include a network connection (which may be a wired or wireless connection), persistent local storage (including, without limitation, flash storage or hard drive storage, etc.), memory (e.g., working memory, random access memory ("RAM"), etc.), and one or more processors or central processing units ("CPUs"). Some or all of these are key hardware components that can support infrastructure applications such as cloud computing, hosting applications (including web, email, FTP and computational services), data/content storage, content delivery networks, and/or the like. User devices can be designed for large-scale deployments, and in many cases reside in an end-user's residence or premises. The distribution of such a controlled platform allows for a provider to host distributed infrastructure applications across the distributed network of user devices.

Merely by way of example, in some aspects, a virtual machine can be run on a user device. Access to this virtual machine can be provided to end users. The virtual machine could host any operating system (including, but not limited to, Linux®, Windows®, MAC OS®, etc.). End users can log into these virtual machines and use them as they would a cloud-based server. The connection to the virtual machine by the end user can be direct (i.e., peer-to-peer) or relayed via a centralized computer (e.g., a control server(s) or central server(s), etc.). Each user device could host one or more virtual machines ("VMs"), which may serve one or more applications, and may serve one or more end-users. The experience to an end-user is similar to that of using a cloud computing service provider. The main difference is that the infrastructure for the VM hosting is not centralized in a datacenter but scattered across the distributed user devices.

User devices, in some aspects, may be configured to host applications—including, without limitation, e-mail hosting, web hosting, hosting file transfer protocol ("FTP") services, hosting computational services, and/or the like). User devices can host these services in a similar manner as hosting of such services by traditional cloud-based service providers. Each user device can host one or more of these services serving one or more end-users. As with hosting the virtual machine, the experience to an end-user is similar to that of using a cloud hosting provider. The main difference is that the infrastructure for the application hosting is not located in a datacenter but scattered across the distributed user devices.

In some embodiments, at least one user device (and in some cases, each user device) can be configured to be persistently connected to a centralized server(s) and/or to the network (regardless of whether or not there is a centralized server(s)). This persistent connection can be used for communication related to management, control, and/or monitoring of the virtual machine and other hosted applications on the at least one user device.

In some cases, distributed storage may be provided to end-users using one or more user devices as the storage medium. The experience to an end-user would be similar to that of using a cloud-based storage provider. The main difference is that the storage infrastructure would be the distributed user devices, rather than storage at a centralized datacenter. Additionally, the storage for a particular end-user may be spread across the local storage of one or more user devices. Error correcting coding can be used for efficient redundancy and replication of data across one or more user devices. Additionally, standard redundant array of independent disks ("RAID") techniques can be used to replicate data and/or encode data across multiple user devices, including, but not limited to, RAID0 through RAID9, hybrid or nested RAID (e.g., RAID10, RAID 50, RAID100, etc.), etc. The varying levels of redundancy across one or more user devices allow for probabilistic guarantees on the reliability of the storage that is provided to an end-user. For example, the more user devices an end-user's storage is spread across, the higher the reliability that can be guaranteed.

With regard to content delivery networks ("CDNs"), CDNs are often used to efficiently serve data and handle peak user demand for data. They operate by caching data that is in high demand at various locations in the network, often closer to the end user. By distributing high demand data, the load required to serve the data from a central server is reduced. In some embodiments, a content delivery network may be provided to end-users using one or more user devices as storage caches for content (e.g., media content, including, without limitation, video content, audio content, image content, video game content, user-generated content, software applications, and/or the like) that is traditionally served off a central server. When users request content, the content can be served from a user device rather than a centralized server, reducing the load on the centralized server. Data that is in high demand can be cached on more user devices, while data that is in less demand can be cached on fewer user devices.

Owners of user devices can be provided with a broad range of control as to how their user devices are used. For instance, owners of user devices might be given the ability to "opt-in" to permitting their user devices to be used for distributed infrastructure purposes. Some owners of devices may not wish to have their devices used by others. This may be due to privacy concerns, security concerns, and/or not wanting system resources of their user devices (e.g., the CPU, memory, disk/storage capacity, and/or the like) to be used by others. Herein, "disk," "disk storage," "disk/storage," "local disk," and so on, might refer to any suitable type of local data storage device, which may or may not utilize disk-based data storage technologies; in some embodiments, these terms might refer to non-volatile memory including, but not limited to, hard disks, floppy disks, magnetic tapes, optical discs, holographic memory, erasable programmable read-only memory ("EPROM"), electrically erasable programmable read-only memory ("EEPROM"), flash memory, magnetoresistive random access memory ("MRAM"), and/or the like. Owners of user devices may also be given the ability to "opt-in" to certain types of infrastructure being hosted from their devices. In some cases, owners may want certain types of infrastructure hosted, but not others. The ability to selectively opt-in gives them the capability to choose.

According to some embodiments, owners of user devices may be given the ability to determine the amount of resources they would like to dedicate to distributed infrastructure. Merely by way of example, a device owner may be willing to provide up to 50% of the device's CPU, 25% of its memory, 20% of its local storage, etc., for distributed infrastructure purposes. In some instances, user device owners may be compensated for the use of their device to provide distributed infrastructure. The compensation can be monetary or in other forms (e.g., rebates, discounts, access to other content and/or functionality, and/or the like). Additionally, the compensation can be varied based on the type of infrastructure that is hosted on the owner's user device. For example, hosting a virtual machine for cloud computing could be valued at a first level, while hosting an email domain valued at a second level different from the first level. Further, the compensation can be varied based on the amount of resources that a device owner is willing to provide. For example, a device owner could be compensated more if he or she is willing to allow 20% of the local disk to be used for distributed infrastructure rather than 10%.

In an aspect, the suitability of a particular user device to host one or more distributed infrastructure applications may be measured. The suitability of the user device can include, without limitation, metrics such as disk (or local storage) usage, memory usage, CPU usage, network speed, network latency, firewall conditions, amount of time the device is being used by the user device owner, etc. Further, the suitability of the device can also factor in the amount of resources the owner of the device is willing to provide for distributed infrastructure. A distributed infrastructure application may be provisioned on a user device based on the suitability metric described above, and based on the application that is being provisioned. A centralized server, in some embodiments, can be used to facilitate the provisioning of a particular user device, including downloading and installing the distributed application that the user device is hosting.

In some embodiments, the system can replicate and make one or more copies of the distributed application that is being hosted on a particular user device. A copy can be kept on a centralized server. Further, the copy can keep track of state information, such as the actual state of a virtual machine. The copy can be updated frequently, such that the central server has one or more snapshots of a particular application. The copy can serve as a backup in case of performance issues, like device failure, network issues, power failure, etc. The backup can facilitate moving the hosted application from one user device to another. In some cases, the central server can be embodied as one or more of the user devices.

Performance of a user device and of a distributed infrastructure application hosted on a user device may be monitored. This can be accomplished via a side communication channel between the user device and a central server. Statistics such as CPU load, memory usage, disk usage, disk/storage read and write speed, network speed, network latency both for the system overall and for a particular hosted application can be reported to the server. Actions or courses of action may be triggered, based on the performance metrics of user devices and the performance metrics related to applications hosted on the devices. Actions can include moving a hosted application from one user device to another when certain metrics call for such an action (for example if the CPU load is too high, and/or the disk/storage is too full, or the like). In some cases, based on usage of the user device by the device owner, the resources of the user device can be reduced in real-time. This prevents the user experience of the device owner from being compromised by hosted distributed infrastructure applications. Actions that can be taken include, without limitation, reducing (to varying degrees, up to eliminating) the CPU load, disk/storage speed, network speed, and/or usage allowed by the hosted application(s). Additionally, another approach might include adjusting the priority of the distributed infrastructure application in real-time when the usage of the device by the device owner is detected.

In some cases, traffic requests (e.g. hypertext transfer protocol ("HTTP") requests) to user devices may be redirected. Such redirection may occur on a per request basis, based on factors such as the geography of the requestor, or the like. The redirect need not be to the same port, e.g., port 80 traffic may be redirected to not only a different IP address but also to a different port. Along with this, the user device may be configured to service the traffic requests as specified by a controlling entity, e.g., another server. Such redirecting of traffic can be particularly useful when there is a large amount of computation, traffic, and/or user requests. Further, mechanisms may be provided that allow content such as movies (or portions thereof) to be rapidly deployed to user devices for services of traffic requests.

In sum, the techniques described herein enable virtual server farms with low investment, since the user devices are being purchased by end-users. The service provider therefore avoids (at least in part) purchasing computers, housing computers, paying electricity bills, and/or paying for network connectivity.

Exemplary Embodiments

FIGS. 1-5 illustrate exemplary embodiments that can provide some or all of the features described above. The methods, systems, and apparatuses illustrated by FIGS. 1-5 may refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 illustrates a functional diagram of a system 100 for controlling one or more user devices 105. The skilled reader should note that the arrangement of the components illustrated in FIG. 1 is functional in nature, and that various embodiments can employ a variety of different structural architectures. Merely by way of example, one exemplary, generalized architecture for the system 100 is described below with respect to FIG. 5, but any number of suitable hardware arrangements can be employed in accordance with different embodiments.

A user device 105 can be any device that has processing capability, random access memory, transient storage, and/or the like (collectively referred to herein as "computing resources") that can participate in a distributed infrastructure arrangement as described herein. In some cases, a user device 105 might have one or more sensors (e.g., as described with respect to the VCDs in the '182 patent and the PDDs in the Mobile Presence Detection Applications), such as microphones, cameras, location sensors (e.g., GPS receivers), infrared sensors, distance measurement sensors, and the like, and input from such sensors can also be considered a type of computing resource, in accordance with some embodiments. Thus, for example, a distributed infrastructure system, as described herein, might be able to gather and/or employ input from such sensors (such as facial expressions, spoken expressions, and/or gestures, to name a few examples, but more generally including any type of data that can be captured by such sensors) across a potentially large number of such user devices. Such input (which might be collected only with user consent, to protect user privacy) can be used for a variety of applications, such as gauging mass reaction to particular news events or other stimuli (e.g., watching particular television programs, playing newly-released video games, etc.).

In some aspects, a user device 105 is capable of communicating with a control server 110 over a network 115 and/or can provide any of a variety of types of video communication, content delivery, gaming, and/or presence detection functionality. Merely by way of example, in some aspects, a user device 105 can be capable of providing pass through video/audio to a display device (and/or audio playback device) from another source (such as a set-top box), and/or overlaying such video/audio with additional content generated or received by the user device 105. In other aspects, a user device 105 can comprise one or more sensors (e.g., digital still cameras, video cameras, webcams, security cameras, microphones, infrared sensors, touch sensors, and/or the like), and/or can be capable, using data acquired by such sensors, of sensing the presence of a user, identifying a user, and/or receiving user input from a user; further, a user device 105 can be capable of performing some or all of the other functions described herein and/or in the Related Applications. Hence, in various embodiments, a user device 105 can be embodied by a video calling device, such as any of the video communication devices described in U.S. Pat. No. 8,144,182, a laptop computer, a desktop computer, a mobile phone, a smart phone, a tablet computer, a video game console, and/or a streaming media player, to name a few non-limiting examples. In some instances, user device 105 might include presence detection functionality similar to the presence detection device ("PDD") as described in detail in the Mobile Presence Detection Application.

In one aspect of certain embodiments, as described more fully with respect to FIG. 3 below, a user device 105 can be placed functionally inline between a local content source and a display device, although this is not required in all embodiments. A local content source can be any device that provides an audio or video stream to a display device and thus can include, without limitation, a cable or satellite set-top box ("STB"), an Internet Protocol television ("IPTV") STB, devices that generate video and/or audio, and/or acquire video and/or audio from other sources, such as the Internet, and provide that video/audio to a display device; hence a local content source can include devices such as a video game console, a Roku® streaming media player, an AppleTV®, and/or the like. Hence, when situated functionally inline between a local content source and a display device, the user device can receive an audiovisual stream output from the local content source, modify that audiovisual stream in accordance with the methods described herein, and provide the (perhaps modified) audiovisual stream as input to the display device. It should be noted, however, that, in some cases, the functionality of a local content source can be incorporated within a user device, and/or the functionality of a user device can be incorporated within a local content source; further, it should be appreciated that a user device (which might or might not include local content source functionality) can be disposed inline with one or more other local content sources or one or more other user devices. Hence, for example, a user device with some local content source functionality (such as a video game console) might be disposed inline between one or more other user devices or one or more other local content sources (such as a cable STB, satellite STB, IPTV STB, and/or a streaming media player) and a display device.

In an aspect of some embodiments, the system can include a software client that can be installed on a computing device (e.g., a laptop computer, wireless phone, tablet computer, etc.) that has a built-in camera and/or has a camera attached (e.g., a USB webcam). This client can act as an interface to allow remote control of the built-in and/or attached camera on the computing device. In some embodiments, the computing device might have a built-in microphone(s) and/or has a microphone(s) attached (e.g., a table-top microphone, a wall-mounted microphone, and/or a microphone removably mountable on a television, on the user device, and/or on some other suitable user device, or the like). The software client can alternatively and/or additionally act as an interface to allow remote control of the built-in and/or attached microphone on the computing device. In some cases, the camera and/or microphone can be automatically or autonomously controlled to obtain optimal video and/or audio input.

The system 100 can further include a control server 110, which can have any suitable hardware configuration, and an example of one such configuration is described below in relation to FIG. 3. In one aspect, the control server 110 is a computer that is capable of receiving user input via a user interface 120 and/or performing operations for controlling the user device(s) 105, for example as described in further detail below. As used with regard to the relationship between the control server 110 and a user device 105, the term "control" should be interpreted broadly to include any operations that operate, configure, or directly control the user device 105, as well as operations that facilitate communication between the user device 105 and other devices, networks, content sources, and the like, and/or operations that provide processing support to a user device 105. Merely by way of example, however, the control server 110 can detect user presence, identify/authenticate users, and/or obtain and distribute content to present users. In other cases, the control server can receive and/or store user input and/or user preferences that can specify whether and how presence information should be used, whether and how the user's user device(s) may be used in the distributed infrastructure, whether and how the user's content and profiles should be handled under certain situations, and/or the like. Detailed description of user presence detection and corresponding use of user input and/or user preferences is provided in the '928 Application, which has already been incorporated herein.

The control server 110 can provide a user interface (which can be used by users of the user devices 105, advertisers, and/or the like). The control server 110 might also provide machine-to-machine interfaces, such as application programming interfaces ("APIs"), data exchange protocols, and the like, which can allow for automated communications with the user devices 105, etc. In one aspect, the control server 110 might be in communication with a web server 125 and/or might incorporate the web server 125, which can provide the user interface, e.g., over the network to a user computer (not shown in FIG. 1) and/or a machine-to-machine interface. In another aspect, the control server 110 might provide such interfaces directly without need for a web server 125. Under either configuration, the control server 110 provides the user interface 120, as that phrase is used in this document. In some cases, some or all of the functionality of the control server 110 might be implemented by the user device 105 itself.

In an aspect, the user interface 120 allows users to interact with the control server 110, and by extension, the user devices 105. A variety of user interfaces may be provided in accordance with various embodiments, including without limitation graphical user interfaces that display, for a user, display fields on display screens for providing information to the user and/or receiving user input from a user.

Merely by way of example, in some embodiments, the control server 110 may be configured to communicate with a user computer (not shown in FIG. 1) via a dedicated application running on the user computer; in this situation, the user interface 120 might be displayed by the user computer based on data and/or instructions provided by the control server 110. In this situation, providing the user interface might comprise providing instructions and/or data to cause the user computer to display the user interface. In other embodiments, the user interface may be provided from a web site, e.g., by providing a set of one or more web pages, which might be displayed in a web browser running on the user computer and/or might be served by the web server 125. As noted above, in various embodiments, the control system 110 might comprise the web server and/or be in communication with the web server 125, such that the control server 110 provides data to the web server 125 to be incorporated in web pages served by the web server 125 for reception and/or display by a browser at the user computer.

Figure 5:
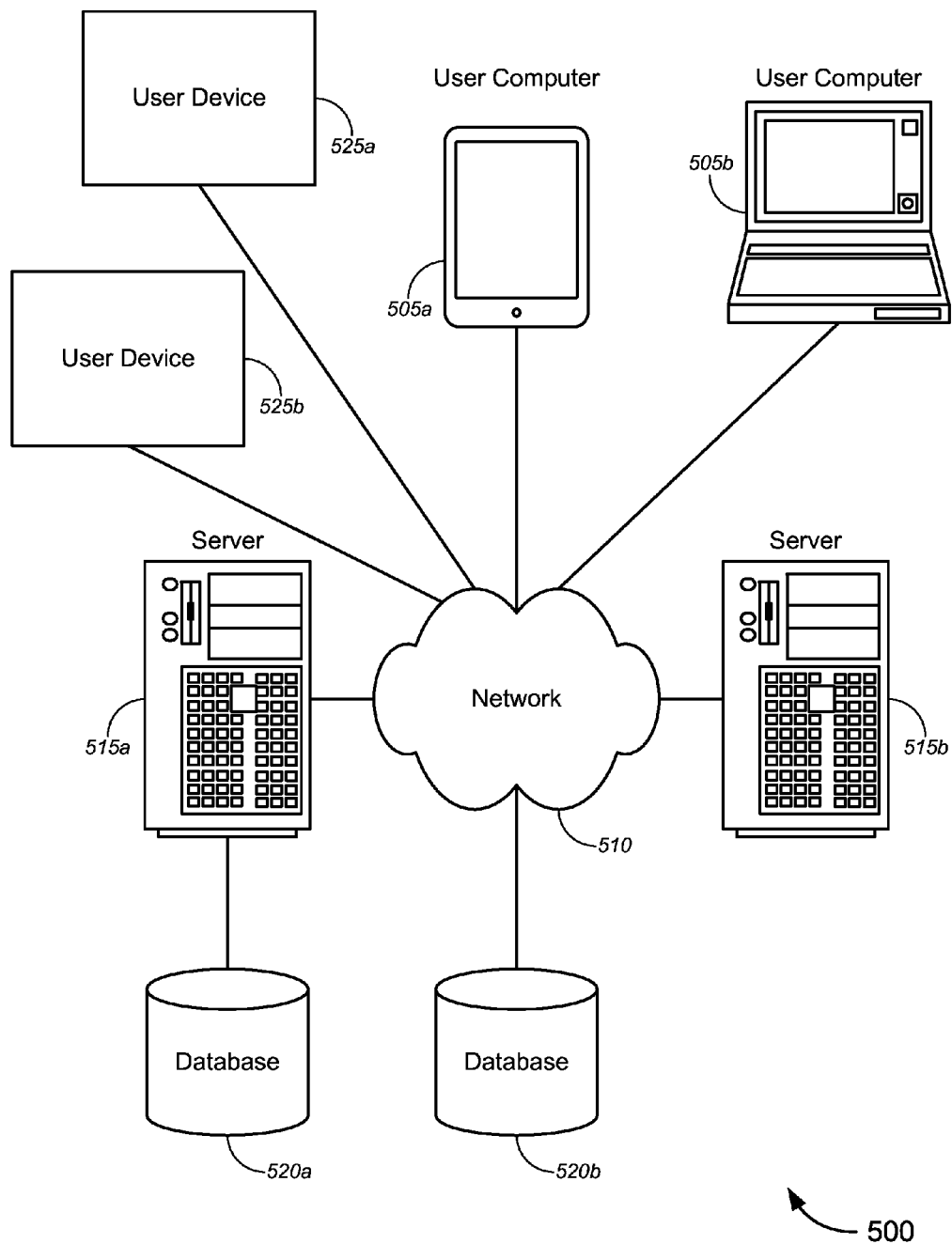
FIG. 5 is a block diagram illustrating a networked system of computers, which can be used in accordance with various embodiments.

The network 115, specific examples of which are described below with regard to FIG. 5, can be any network, wired or wireless, that is capable of providing communication between the control server 110 and the user devices 105, and/or of providing communication between the control server 110 (and/or the web server 125) and a user computer. In a specific embodiment, the network 115 can comprise the Internet, any television distribution network, and/or any Internet service provider ("ISP") access networks that provide Internet access to the control server 110, the user computer, and/or the user devices 105.

In some embodiments, the system 100 can include a cloud storage system 130, which can be used, as described in further detail below, to store advertisements, presence information, images, and/or video that are captured and uploaded by the user devices 105, and/or the like. In some cases, the cloud storage system 130 might be a proprietary system operated by an operator of the control server 110. In other cases, the cloud storage system 130 might be operated by a third party provider, such as one of the many providers of commercially available cloud services. In yet a further embodiment, the cloud storage system 130 might be implemented by using resources (compute, memory, storage network, etc.) shared by a plurality of user devices distributed among various users of the system. Merely by way of example, as described in further detail below, a plurality of user devices might each have some dedicated computing resources (such as a storage partition), which are dedicated for use by the system, and/or some ad hoc resources (such as network bandwidth, memory, processing resources, etc.) that are available to the system when not in use by a user. Such resources can be used as cloud storage and/or can be used to provide a distributed, cloud-like platform on which a control server can run as a virtual machine, cloud container, and/or the like.

According to some embodiments, user device 105 might comprise a video input interface to receive video input from a local content source (e.g., a cable, satellite, or IPTV set-top box ("STB"), and/or the like) and an audio input interface to receive audio input form the local content source. User device 105 might further comprise a video output interface to provide video output to a video display device and an audio output interface to provide audio output to an audio receiver. In some cases, the video display device and the audio receiver might be embodied in the same device (e.g., a TV with built-in speaker system, or the like). With the input and output interfaces, user device 105 might provide pass-through capability for video and/or audio between the local content source and the display device. In some instances, high-definition multimedia interface ("HDMI") cables or other suitable HD data/signal cables may be used to provide the interconnections for the pass-through. User device 105 may, in some cases, comprise a video capture device to capture at least one of image data or video data and an audio capture device to capture audio data. User device 105 may also comprise a network interface, at least one processor, and a storage medium in communication with the at least one processor.

In some aspects, a plurality of user devices 105 might be communicatively coupled together in a network (e.g., network 115), each user device being located in one of a plurality of customer premises. In some cases, multiple user devices may be located in a single customer premises. For implementing distributed infrastructure for cloud computing, cloud-based application hosting, and/or cloud-based data storage, a computer (which might be a control/central server over a network, another user device of the plurality of user devices 105 over the network, and/or the like) might establish one or more user devices 105 of the plurality of user devices 105 as distributed infrastructure elements and might provide at least one of one or more software applications, customer data, and/or media content to the one or more user devices 105 for hosting on the one or more user devices 105. In some embodiments, establishing the one or more user devices 105 as distributed infrastructure elements might comprise the computer installing software, applications, or software applications on at least two user devices 105 of the one or more user devices 105 to enable distributed processing of software applications across the at least two user devices 105. In some instances, establishing the one or more user devices 105 as distributed infrastructure elements might comprise the computer installing software, applications, or software applications on at least two user devices 105 of the one or more user devices 105 to enable hosting of software applications across the at least two user devices 105. Alternatively, or in addition, establishing the one or more user devices 105 as distributed infrastructure elements might comprise the computer installing, with the computer, software on at least two user devices 105 of the one or more user devices 105 to enable distributed storage of one or more of customer data or media content across the at least two user devices 105. Providing the at least one of one or more software applications, customer data, and/or media content to the one or more user devices 105 for hosting on the one or more user devices 105 might, in some instances, comprise the computer providing mirrored copies of the at least one of one or more software applications, customer data, and/or media content to each of at least two user devices 105. In alternative or additional embodiments, providing the at least one of one or more software applications, customer data, and/or media content to the one or more user devices 105 for hosting on the one or more user devices 105 might comprise the computer providing portions of each of the at least one of one or more software applications, customer data, and/or media content to each of at least two user devices 105.

In some cases, the computer might be at least one of the plurality of user devices 105; in some embodiments, the computer might be at least one of the one or more user devices 105 that are established as distributed infrastructure elements. Alternatively or in addition, the computer might be a control server (e.g., control server 110) in communication with the plurality of user devices 105 over the network 115. In other words, a user device 105 that is not being used for distributed infrastructure purposes may be used to control one or more user devices 105 that are established as distributed infrastructure elements. Alternatively, a user device 105 that has been established as a distributed infrastructure element may be used to control other user devices 105 that are established as distributed infrastructure elements. Alternatively, or in addition, a control server (e.g., a non-user device server computing system) in the network may be used to control the one or more user devices 105 that are established as distributed infrastructure elements.

In some instances, the computer might determine a redundancy level for hosting each of the at least one of the one or more software applications, the customer data, or the media content across the one or more user devices 105. The redundancy level, in some cases, might comprise, without limitation, an appropriate indicator denoting the number of copies of the software application, data, and/or media content for cloud-based application hosting (i.e., indicative of the number of user devices 105 for hosting the software application, data, and/or media content); the number of portions to divide each software application, data, and/or media content; an index indicating a level of geographical diversity; and/or a particular redundant array of independent disks ("RAID")-type level or configuration, or the like. In some embodiments, the level of geographic diversity might include, without limitation, separate but neighboring or nearby buildings, separate but nearby municipalities, separate but nearby states or provinces, opposite or distant parts of a municipality, opposite or distant parts of a state or province, states or provinces separated by one or more other states or provinces, across a nation, across several nations, and/or dispersed throughout the world, or the like. RAID-type levels or configurations, as known in the art, might include RAID0 through RAID9, and/or hybrid or nested RAID (e.g., RAID10, or the like), each level or configuration being indicative of well-defined types of data storage redundancy and associated other characteristics (e.g., with or without mirroring, with or without parity, minimum number of drives necessary, space efficiency, fault tolerance, array failure rate, read and write performance, etc.). In some embodiments, the computer might provide the at least one of one or more software applications, customer data, and/or media content to the one or more user devices 105, based at least in part on the determined redundancy level for hosting each of the at least one of the one or more software applications, the customer data, and/or the media content across the one or more user devices 105.

According to some aspects, the computer might collect resource usage information, network connectivity information, or both, for each of the one or more user devices 105. The computer might determine suitability of each of the one or more user devices 105 to host the at least one of one or more software applications, customer data, and/or media content, based at least in part on one or more of the collected resource usage information and/or the collected network connectivity information.

The user, in accordance with some embodiments, might be given the ability to choose how his or her user device may be used, e.g., for distributed infrastructure purposes. In some instances, the computer might receive user input from the user among a plurality of users indicating what type of software applications, customer data, and/or media content are permitted to be hosted on a user device 105 owned by the user. In some non-limiting examples, the user might allow hosting some types of applications (e.g., e-mail hosting, web hosting, etc.) but not allowing hosting some other types of applications (e.g., file transfer protocol ("FTP") services, and hosting computational services, or the like). In some examples, the user might permit storage of some media content (e.g., media content provided by legitimate sources), but might block storage of other media content (e.g., media content provided by unknown or questionable sources).

The computer might also receive user input from the user indicating at least one of a level of processing power or a level of storage on the user device 105 owned by the user that is permitted for hosting the indicated type of software applications, customer data, and/or media content. The user, in one non-limiting example, may be willing to provide up to 40% of the device's CPU, 20% of its memory, 15% of its local storage, etc. In some examples, the user might put a cap on the network bandwidth allocated to distributed infrastructure implementation.

The computer, in some embodiments, might label each of the one or more user devices 105 with a first label, a second label, or both. The first label might indicate the type of distributed hosting, based on the indicated type of software applications, while the second label might indicate capacity of distributed hosting, based on the at least one of the indicated level of processing power or the indicated level of storage. The computer might determine suitability of each of the one or more user devices 105 to host the at least one of one or more software applications, customer data, or media content, based at least in part on one or more of the first label or the second label. In some cases, the computer might provide the at least one of one or more software applications, customer data, and/or media content to the one or more user devices 105, based at least in part on at least one of the first label, the second label, and/or the determined suitability of each of the one or more user devices to host the at least one of one or more software applications, customer data, or media content.

According to some embodiments, the computer might monitor performance of at least one of the one or more user devices 105, performance of the distributed infrastructure elements as a whole, or both. The computer might determine one or more courses of action to invoke, based at least in part on performance metrics of the at least one user device 105, performance metrics of the distributed infrastructure elements as a whole, or both. Based on such determination, the computer might invoke the one or more courses of action. For example, in the case that the performance metrics indicate that a particular user device 105 has reached (or is close to reaching) its labeled threshold capacity, the computer might invoke a course of action that reroutes data and/or media content to another user device 105 for cloud-based application hosting or distributed storage thereon. In other examples, if the resources of the particular user device are being utilized to a greater than usual extent by its owner, then regardless of whether or not the levels set by the user for distributed infrastructure have been reached (or are close to being reached), the computer might invoke a course of action to give priority to the owner's usage, and to reduce or eliminate the use of the resources of the particular user device for distributed infrastructure purposes (i.e., by utilizing other user devices 105 (either nearby or distant user devices)).

As discussed above, the owner of a user device 105 may, in some embodiments, be compensated for the use of his or her user device 105 as a distributed infrastructure element. In such embodiments, the computer might monitor usage of the user device 105 owned by a user, among the one or more user devices, as a distributed infrastructure element over a first period (e.g., a week, two weeks, a month, two months, a quarter, half a year, a year, etc.). For example, the computer might monitor processor usage, memory usage, local storage usage, and/or network usage, etc. In some cases, the computer might monitor the type of cloud-based application hosting that the particular user device 105 has been used for (e.g., for hosting applications including, but not limited to, e-mail, websites, FTP services, and/or computational services, etc.; for distributed storage of data and/or media content, etc.).

The computer might subsequently determine appropriate compensation to the user for use of the user device 105 owned by the user as a distributed infrastructure element over the first period. For example, the user might be compensated by rebates, discounts, coupons, money, etc. for the use of his or her user device(s) as a distributed infrastructure element(s). The user might be compensated more for, e.g., 20% CPU usage compared with 15% CPU usage, or the like. Similarly, the user might be compensated more for one of e-mail hosting, web hosting, hosting FTP services, hosting computational services, and/or distributed storage of data and/or media content, but less for another of e-mail hosting, web hosting, hosting FTP services, hosting computational services, and/or distributed storage of data and/or media content.

In various embodiments herein, each user device 105 might adhere to one of a limited number of classes of hardware, where each class of hardware might have a known, common hardware configuration. This may be distinct from, e.g., personal computers, which can have an unlimited number of classes of hardware, with unlimited options for different hardware (and software) configurations, where a plurality of such unlimited number of classes of hardware may have unknown, and non-common hardware configurations, making logistics for distributed infrastructure extremely difficult to manage.

In a non-limiting example of user devices 105 adhering to a limited number of classes of hardware, a particular generation of a gaming console might have one or more revisions or releases, which might occur for any number of reasons, including, without limitation, particular bundle releases (e.g., "Star Wars edition" of the gaming console, etc.), advertising reasons (e.g., "Hobbit edition" of the gaming console in conjunction with theatrical release of the latest Hobbit movie, etc.), cost and availability of hardware components (e.g., the processor manufacturer may be discontinuing a particular processor and releasing a new model, etc.), improvements in hardware capabilities or functionalities (e.g., the new graphics processor might be capable of rendering higher definition graphics, or a new camera might have much higher resolution, etc.), and/or the like. The gaming console might have generation releases (e.g., first generation console, second generation console, and so forth), each successive generation release being an improvement in terms of hardware and software capability, and perhaps having slightly (or vastly) different form factors. In some instances, each generation of the gaming console might represent a different class of hardware. In other instances, each revision or release of each generation of the gaming console might represent a different class of hardware. Regardless, although each class (whether at the granularity of generation release or revision release, and/or the like) might have slightly different sets of hardware components with slightly different hardware capabilities and functionalities, each user device (in this example, gaming console) might have at least a minimum common hardware configuration. In some examples, the minimum common hardware configuration for each such user device might include, without limitation, one or more of a high capacity/speed processor(s) (e.g., at least 1 GHz processor), large capacity memory (e.g., at least 8 Gb RAM), large capacity storage (e.g., at least 10 Gb local storage), high resolution camera (e.g., at least 8 megapixel), and/or the like.

In some embodiments, establishing such user devices 105 as distributed infrastructure elements might comprise determining a class of each of the plurality of user devices, and determining capabilities of each user device 105, based on the determined class of each user device. Based at least in part on the determined capabilities of each user device 105, at least one of one or more software applications, customer data, or media content may be provided to such user devices 105 accordingly, for cloud computing, cloud-based application hosting, and/or cloud-based data storage, or the like, in accordance with the various embodiments herein. Although the example above refers to a gaming console, any suitable user device may be implemented (so long as they have common hardware configurations distributed across a limited number of classes of hardware)—including, without limitation, VCDs, smart smoke/CO detectors, cameras (having processor, memory, local storage, and/or network functionality), and/or the like. Establishing distributed infrastructure with such user devices allows for utilizing normally underutilized hardware over known minimum hardware capable components, with minimal overhead costs in terms of network and hardware maintenance (typically incurred by cloud service providers), much of which may already be borne by the user/owner of such user devices at the user/owner's premises for the primary functions of such user devices (e.g., as a gaming device, a video calling device, a smoke/CO detector, a camera, and/or the like).

Figure 2:
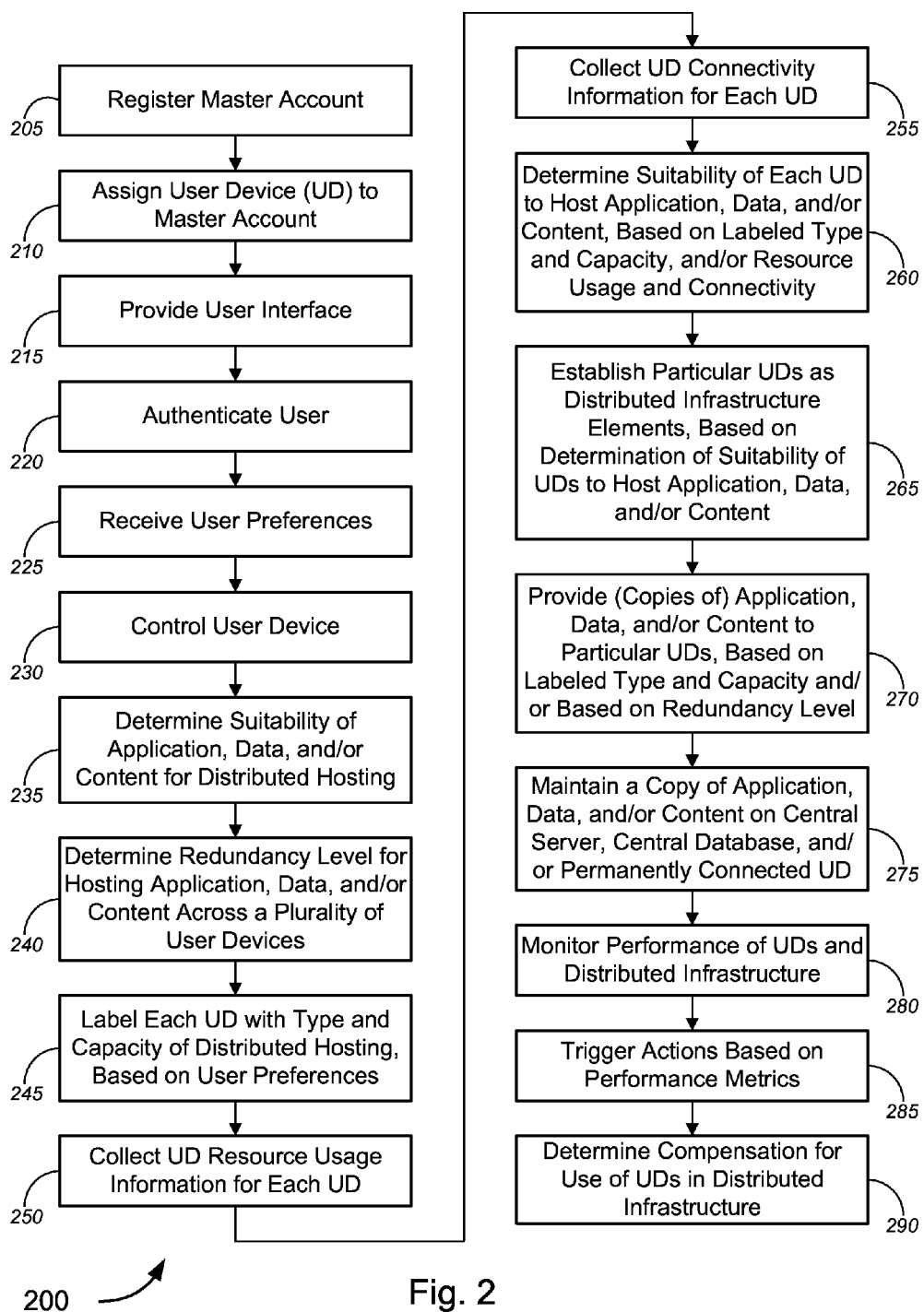
FIG. 2 is a process flow diagram illustrating a method of implementing distributed infrastructure for cloud computing, cloud-based application hosting, and/or cloud-based data storage, in accordance with various embodiments.

FIG. 2 illustrates a method 200 of implementing distributed infrastructure for cloud computing, cloud-based application hosting, and/or cloud-based data storage, in accordance with one set of embodiments. While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by (and, in some cases, are described below with respect to) the system 100 of FIG. 1 (or components thereof), such methods may also be implemented using any suitable hardware implementation. Similarly, while the system 100 of FIG. 1 (and/or components thereof) can operate according to the method illustrated by FIG. 2 (e.g., by executing instructions embodied on a computer readable medium), the system 100 can also operate according to other modes of operation and/or perform other suitable procedures.

Turning to FIG. 2, the method 200 might comprise registering a master account for a user (block 205). In accordance with various embodiments, registering a master account for a user can comprise a variety of operations. Merely by way of example, registering a master account can comprise creating a database entry for a particular user and/or assigning authentication credentials to that user; these credentials can be used to access the master account, as described in further detail below.

The method 200 can also include assign one or more user devices to the master account (block 210). As discussed above, the one or more user devices can be embodied by a video calling device, such as any of the video communication devices described in U.S. Pat. No. 8,144,182, a laptop computer, a desktop computer, a mobile phone, a smart phone, a tablet computer, a video game console, and/or a streaming media player, to name a few non-limiting examples. For instance, the user might identify any user devices that the user owns (or is otherwise associated with; e.g., members of the user's family might be associated with the devices owned by the user), and the system can assign those user devices to the user's master account. According to some embodiments, the user's master account might include any suitable number of sub-accounts. In one example, each member of the user's family might be associated with a sub-account linked with the master account. In some instances, the user (or some members of his or her family) might have a work/school sub-account and a home sub-account, the former being associated with profiles and/or media content appropriate for school or work, while the latter being associated with all, or all other, profiles and/or media content. In some embodiments, the master account and the plurality of sub-accounts might be organized as a hierarchy, with the master account (being at the top of the hierarchical structure) having full access to profiles and media content of each sub-account, the sub-accounts at the next level having access to profiles and/or media content of only those sub-accounts that the master account has given access to, and the sub-accounts at lower levels having limited access to profiles and/or media content. For example, the user's master account might have access to all profiles and/or media content associated with the master account and the sub-accounts. The user can provide his or her spouse with a sub-account having the same access to profiles and/or media content, while providing limited access to profiles and/or media content to each of the user's children's sub-account(s). In some instances, the user and/or the user's spouse might impose limits on access to profiles and/or media content for each of their work sub-accounts.

In some cases, each user device might have an identifier, such as a hardware identifier, IP address, nickname, and/or the like, by which the system can address the user device, and assigning a user device to the master account can comprise associating that identifier with the master account. When a user device is assigned to a master account, the user of that account will be able to access, configure, and/or control the user device through the control server, for example as described in further detail below. In some cases, the user might own a plurality of user devices and might wish to control all of the user devices from a single master account. In an aspect, a user can identify such devices through a user interface to the control server.

In another aspect, as described briefly above, the assignment process can be simplified. When the user first configures a user device (usually locally, but perhaps over the network), the user can provide credentials to the user device that associate the device with the master account. Thereafter, the user device might be configured to communicate with the control server and identify itself using those credentials; at that point, the control server can assign the user device to the master account, and no credentials need to be stored on the user device from that point forward (other than perhaps the user device's own identifying information).

Hence, the method 200, in the illustrated embodiment, might further comprise providing a user interface to allow interaction between the user and the control server (block 215). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving, and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic Hypertext Markup Language ("HTML") and/or Asynchronous JavaScript and XML (or extensible markup language) ("AJAX") technologies, to name but a few examples.

In many cases, providing a user interface will comprise providing one or more display screens each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to log on to a master account, access user devices via the control server, etc.

In an aspect of some embodiments, the user logs onto his or her master account at the control server in order to access and/or control user devices assigned to that account. Accordingly, at block 220, the method 200 can include authenticating the user with a set of credentials associated with the master account (e.g., with any of several known authentication schemes, such as a userid/password challenge, a certificate exchange process, and/or the like, as well as authentication techniques, described in further detail below, that employ sensors on a user device, such as facial recognition, voiceprint analysis, gesture-based identification, spoken identifiers, and/or the like). Once the user has been authenticated, the user interface can present the user with a variety of different information, including without limitation information about status of user devices assigned to the master account to which the user has logged on, options for controlling such user devices, and/or the like.

Thus, in some aspects, the method 200 might further comprise receiving (e.g., via a network, such as the Internet, to name one example) user preferences (block 225), and in particular user preferences relating to how the user would like his or her user devices to participate (or not) in a distributed infrastructure arrangement. The system might receive a variety of other preferences, such as preferences related to mobile presence detection, some of which are described in detail in the Mobile Presence Detection Application, which has already been incorporated herein. The method 200, then, can further include controlling and/or configuring the user device, in some cases based at least in part on the user preferences (block 230).

With respect to distributed infrastructure functionality, user preferences might include, without limitation, preferences indicating whether or not to allow a user device owned by the user to be used for distributed infrastructure; preferences indicating what type of software applications, customer data, and/or media content (of other user device users and/or subscribers of a cloud service) are permitted to be hosted on a user device owned by the user; and/or preferences indicating amount of resources of a user device to dedicate to the distributed infrastructure; etc. In some embodiments, in addition to indicating how a user's user device may be used in distributed infrastructure implementation, user preferences might allow a user to indicate how the user's own applications, data, and/or media content may be hosted on other users' user devices. For example, the user might be given the option to encrypt any and/or all personal data, any and/or all personal applications, and/or any and/or all files or lists indicating which media content are associated with the user. Common media content (which might include popular media content, or any other media content) may remain unencrypted for common usage by any number of users on any number of user devices, subject only to any subscription, rental, or purchase restrictions on the particular media content as associated with any user and/or any user device.

In some examples, the user might indicate that her user device may be used for distributed processing, but not distributed cloud-based data storage, or vice versa. Alternatively, the user might indicate that her user device may be used for both distributed processing and distributed cloud-based data storage. In some embodiments, the user might allow the hosting, on his or her user device, of at least portions of software applications that are published by known and reputable software companies or published by companies on behalf of governmental agencies, or the like, while blocking hosting of software applications associated with marketing, spam, data mining, and/or potential copyright violations, etc. The user might also, in some instances, require indications that any customer data and/or media content do not violate valid copyrights, or the like. For instance, media content provided by legitimate paid subscription services or content providers on behalf of the subscribers with whom the media content are associated might be associated with such an indication, which in some cases might be by virtue of the association with one or more databases associated with the legitimate paid subscription service providers or content providers. Rather than association with the subscribers of a content provider, the media content may be directly associated with the content provider, in which case the indication of non-violation of valid copyrights might be inferred by virtue of association with one or more databases associated with the legitimate content provider. In some embodiments, user preferences might include preferences whether or not to allow hosting of at least portions of e-mail domains, social media websites, news sites, personal websites, academic websites, professional websites (e.g., for law offices, medical clinics, hospitals, engineering firms, accounting firms, etc.). In any event, as the distributed processing, distributed application hosting, and/or distributed data storage may be controlled by the cloud service provider or a third party provider, rather than by the individual owners of the user devices, the digital millennium copyright act ("DMCA"), and the limited liability provisions and rules applicable to providers of on-line services may be applicable.

According to some embodiments, the user might set limits on the usage of resources on each user device owned by the user. For example, the user might indicate that, when used as a distributed infrastructure element, CPU usage on each user device should not exceed 50%, memory usage should not exceed 25%, local data storage should not exceed 20%, network bandwidth should not exceed 30% of normal bandwidth, etc. Although specific percentage values are given for this example, the various embodiments are not so limited, and any suitable percentage value or fixed value, or range of percentage or fixed values may be provided as options for the user to select as part of the user preferences for each of CPU usage, memory usage, local data storage usage, and/or network usage, etc. If the user owns more than one user device, the user might be given the option to choose the same values or range of values for all the user devices, or to set individualized preference settings for each user device.

The amount of control imposed by the control server can vary according to embodiment and implementation. Merely by way of example, as noted above, in some embodiments, there might be no control server, and the user device might incorporate all the functionality described herein with regard to the control server, including peer-to-peer functionality, distributed processing functionality, distributed application hosting functionality, and/or distributed data storage functionality with other user devices. In other embodiments, the control server (or one of the other user devices) might provide fairly fine-grained control over the user device, such as instructing the camera to capture images for purposes of determining presence. Alternatively, or additionally, the control server (or one of the other user devices) may receive the images directly and may perform the presence determination, identification, and/or authentication procedures at the control server, in the case of mobile presence detection (for example). In some instances, the control server (or one of the other user devices) might instruct the processor to execute particular portions of one or more software applications designated for distributed processing. In some embodiments, the control server (or one of the other user devices) might instruct the local storage to store particular portions of one or more software, customer data, and/or media content, or the like. The division of responsibility between the control server and the user device can fall anywhere along this spectrum. In some cases, for instance, the control server might provide the user preferences to the user device, which then is responsible for implementing appropriate instructions in accordance with those preferences, and transmitting acknowledgements and/or status information to the control server, which takes the appropriate action in response to the acknowledgements and/or status information—such as, redistributing portions of the one or more software, customer data, and/or media content to other user devices in response to receiving and analyzing the status information, or the like. Alternatively and/or additionally, the user device itself might be responsible for taking such actions.

At block 235, the method 200 can comprise determining suitability of particular software applications, data, and/or media content for distributed hosting (which might include, without limitation, cloud computing, cloud-based application hosting, cloud-based data storage, and/or the like). For example, if a particular software application can easily be split or otherwise divided so as to execute the divided portions of the software application using different processors (i.e., processors of different user devices, or the like), to achieve results similar to results obtainable if the software application as a whole was executed by a single processor, then such particular software application may be deemed suitable for distributed processing. Conversely, if a particular software application cannot be split or otherwise divided so as to execute the divided portions of the software application, to achieve results similar to results obtainable if the software application as a whole was executed, then such particular software application may be deemed unsuitable for distributed processing. Even if a particular software application is deemed unsuitable to be divided for distributed processing, it may be determined if the particular software application as a whole can be executed by each of one or more user devices other than the originating user device or origination computing device. If so, the particular software application might be sent to the one or more user devices for execution thereon.

Likewise, if particular data and/or media content can be divided (and later combined), then such particular data and/or media content might be deemed suitable for distributed data storage. Otherwise, such particular data and/or media content (especially if prone to errors or data corruption if divided and later combined, or the like) may be deemed unsuitable for distributed data storage. Even if a particular data and/or media content are deemed unsuitable to be divided for distributed data storage, it may be determined whether the particular data and/or media content as a whole might be stored on each of one or more user devices other than the originating user device or origination computing device. If so, the particular data and/or media content as a whole might be sent to the one or more user devices for storage thereon.

In a similar manner, if a particular software application cannot be split or otherwise divided such that divided portions of the software application may be hosted on several user devices, to achieve results similar to results obtainable if the software application as a whole was hosted on a single device, then such particular software application may be deemed unsuitable for distributed application hosting. Even if a particular software application is deemed unsuitable to be divided for distributed application hosting, it may be determined if the particular software application as a whole can be hosted by each of one or more user devices other than the originating user device or origination computing device. If so, the particular software application might be sent to the one or more user devices for hosting thereon.

If the particular software application, data, and/or media content are determined to be suitable for hosting, then it may be determined (at block 240) what the redundancy level might be for hosting the particular software application, data, and/or media content across a plurality of user devices. For example, high demand, high priority, and/or sensitive data (either copies and/or portions thereof) might be distributed across a larger number of user devices—e.g., with several copies distributed across geographically diverse user devices, or the like—as compared with low demand, low priority, and low sensitivity data (to name a non-limiting example). Likewise, media content that is of high demand, or the like, (either copies and/or portions thereof) might similarly be distributed across a larger number of user devices—e.g., with several copies distributed across geographically diverse user devices, or the like—as compared with low demand media content (for example). High demand, high priority, and/or sensitive software applications (either copies and/or portions thereof) may also be distributed across a larger number of user devices in a similar manner as high demand, high priority, and/or sensitive data or high demand data, as compared with, e.g., low demand, low priority, and low sensitivity software applications. In some cases, the redundancy level might comprise, without limitation, an appropriate indicator denoting the (minimum) number of copies of the software application, data, and/or media content for cloud-based application hosting (i.e., indicative of the (minimum) number of user devices for hosting the software application, data, and/or media content), the number of portions to divide each software application, data, and/or media content, an index indicating a level of geographical diversity, and/or a particular RAID-type level or configuration, or the like. In some embodiments, the level of geographic diversity might include, without limitation, separate but neighboring or nearby buildings, separate but nearby municipalities, separate but nearby states or provinces, opposite or distant parts of a municipality, opposite or distant parts of a state or province, states or provinces separated by one or more other states or provinces, across a nation, across several nations, and/or dispersed throughout the world, etc. RAID-type levels or configurations might include RAID0 through RAID9, and/or RAID10 or other hybrid or nested RAID, or the like, each level or configuration being indicative of well-defined types of data storage redundancy and associated other characteristics (e.g., with or without mirroring, with or without parity, minimum number of drives necessary, space efficiency, fault tolerance, array failure rate, read and write performance, etc.).

At block 245, method 200 might comprise labelling each (applicable) user device with the type and capacity of distributed hosting, based on the user preferences (e.g., preferences indicating what type of software applications, customer data, and/or media content (of other user device uses or subscribers of cloud services, etc.) are permitted to be hosted on a user device owned by the user and/or preferences indicating amount of resources of a user device to dedicate to the distributed infrastructure, as received at block 225). In some cases, each (applicable) user device might be labelled with a first label indicating type of distributed hosting, based on the indicated type of software applications, customer data, or media content (from block 225), a second label indicating capacity of distributed hosting, based on the at least one of the indicated level of processing power or the indicated level of storage (from block 225), or both the first and second labels.

Method 200 might further comprise collecting user device resource usage information for each user device (at block 250) and/or collecting user device connectivity information for each user device (at block 255). For example, user device resource usage information might include, without limitation, overall CPU usage; CPU usage specific to cloud-based application hosting, distributed processing, and/or distributed data storage (collectively, "distributed hosting"); overall memory usage; memory usage specific to distributed hosting; overall local storage usage; local storage usage specific to distributed hosting; and/or the like. User device connectivity information might include, but is not limited to, overall bandwidth usage, bandwidth usage specific to distributed hosting, maximum upload speeds, minimum upload speeds, average upload speeds, maximum download speeds, minimum download speeds, average download speeds, how often the user device is connected to the network, how often the user device drops connection to the network, how long the user device remains connected to (and/or dropped from) the network, how difficult it is to reconnect a dropped connection between the user device and the network, data loss rates, data fidelity/bit error rates, etc.

At block 260, method 200 might comprise determining suitability of each user device to host software applications, data, and/or media content; in some cases, this determination might be based at least in part on the labelled type and capacity (from block 245), and based at least in part on the collected resource usage and/or connectivity information (from blocks 250 and 255, respectively). Method 200 might further comprise, at block 265, establishing particular user devices as distributed infrastructure elements, based on the determination of suitability of the user devices to host software applications, data, and/or media content (from block 260). In some embodiments, establishing particular user devices as distributed infrastructure elements might comprise installing software on at least two user devices of the one or more user devices to enable distributed processing of software applications across the at least two user devices. In some embodiments, establishing particular user devices as distributed infrastructure elements might comprise installing software on at least two user devices of the one or more user devices to enable hosting of software applications across the at least two user devices. Alternatively, or in addition, establishing particular user devices as distributed infrastructure elements might comprise installing software on at least two user devices of the one or more user devices to enable distributed storage of one or more of customer data or media content across the at least two user devices.

Method 200, at block 270, might comprise providing particular software applications, data, and/or media content (or copies thereof) to the particular user devices, based at least in part on the labelled type and capacity (from block 245), and based at least in part on the determined redundancy level (from block 240). In some embodiments, providing particular software applications, data, and/or media content to the particular user devices may include providing particular software applications, data, and/or media content to the particular user devices, based at least in part on one or more of the collected resource usage information and/or the collected network connectivity information (from blocks 250 and 255, respectively). In some instances, providing particular software applications, data, and/or media content to the particular user devices may include providing particular software applications, data, and/or media content to the particular user devices, based at least in part on at least one of the first label (indicating type of distributed hosting), the second label (indicating capacity of distributed hosting), and/or the determined suitability of each of the one or more user devices to host the at least one of one or more software applications, customer data, or media content. According to some aspects, providing the at least one of one or more software applications, customer data, or media content to the one or more user devices for hosting on the one or more user devices comprises providing, with the computer, mirrored copies of the at least one of one or more software applications, customer data, or media content to each of at least two user devices of the one or more user devices. In some cases, providing the at least one of one or more software applications, customer data, or media content to the one or more user devices for hosting on the one or more user devices comprises providing, with the computer, portions of each of the at least one of one or more software applications, customer data, or media content to each of at least two user devices of the one or more user devices.

In some embodiments, method 200 might, at block 275, include maintaining a copy (or copies) of the particular software applications, data, and/or media content on a central server (e.g., control server, if any), a central database (e.g., cloud database or cloud data store, if any), and/or a permanently connected user device (which might be determined from user device connectivity information collected at block 255). The permanently connected user device might be one of the user devices that has been established as a distributed infrastructure element or one of the user devices that has not been established as a distributed infrastructure element (but might have been configured to have functionality similar to that of a control server, or the like).

At block 280, method 200 might comprise monitoring one or more of performance of at least one user device of the one or more user devices, or performance of the distributed infrastructure elements, as a whole. Method 200, at block 285, might comprise triggering actions or courses of action, based on the performance metrics. The triggering process, in some embodiments, might comprise determining one or more courses of action to invoke, based at least in part on one or more of performance metrics of the at least one user device, or performance metrics of the distributed infrastructure elements (as a whole), and invoking the one or more courses of action, based on said determination.

According to some embodiments, method 200 might further comprise monitoring usage of a user device owned by a user, among the one or more user devices, as a distributed infrastructure element over a first period, and determining compensation to the user for use of the user device owned by the user as a distributed infrastructure element over the first period (block 290). The user (or owner of the user device) may then be compensated accordingly, based on such determination.

The reader should note that a wide variety of presence-based functions (including without limitation those described in the Related Applications) can be performed by the system in conjunction with various techniques described as part of the method 200, and that such functions can be combined in any suitable way. Merely by way of example, the '603 Application (already incorporated herein) described advertising techniques that can be implemented based on detected presence, which is described in the '928 Application (already incorporated herein). Such techniques can be integrated with various techniques described herein as part of the method 200 for implementing distributed infrastructure for cloud computing and/or cloud-based data storage. For instance, the system (e.g., the control server, the user device, etc.) might obtain relevant advertising material as described in the '603 Application and display such advertising over content obtained and delivered using the techniques of the method 200, where the advertising might be part of the content that is part of the distributed data storage functionality. In some cases, the determination of the relevant advertising material for each target subscriber might be determined as part of the distributed processing functionality that first gathers and then analyzes data pertaining to the subscriber's interests. Based on this disclosure, the skilled reader will understand that such techniques can be combined in a number of different ways.

Figure 3:
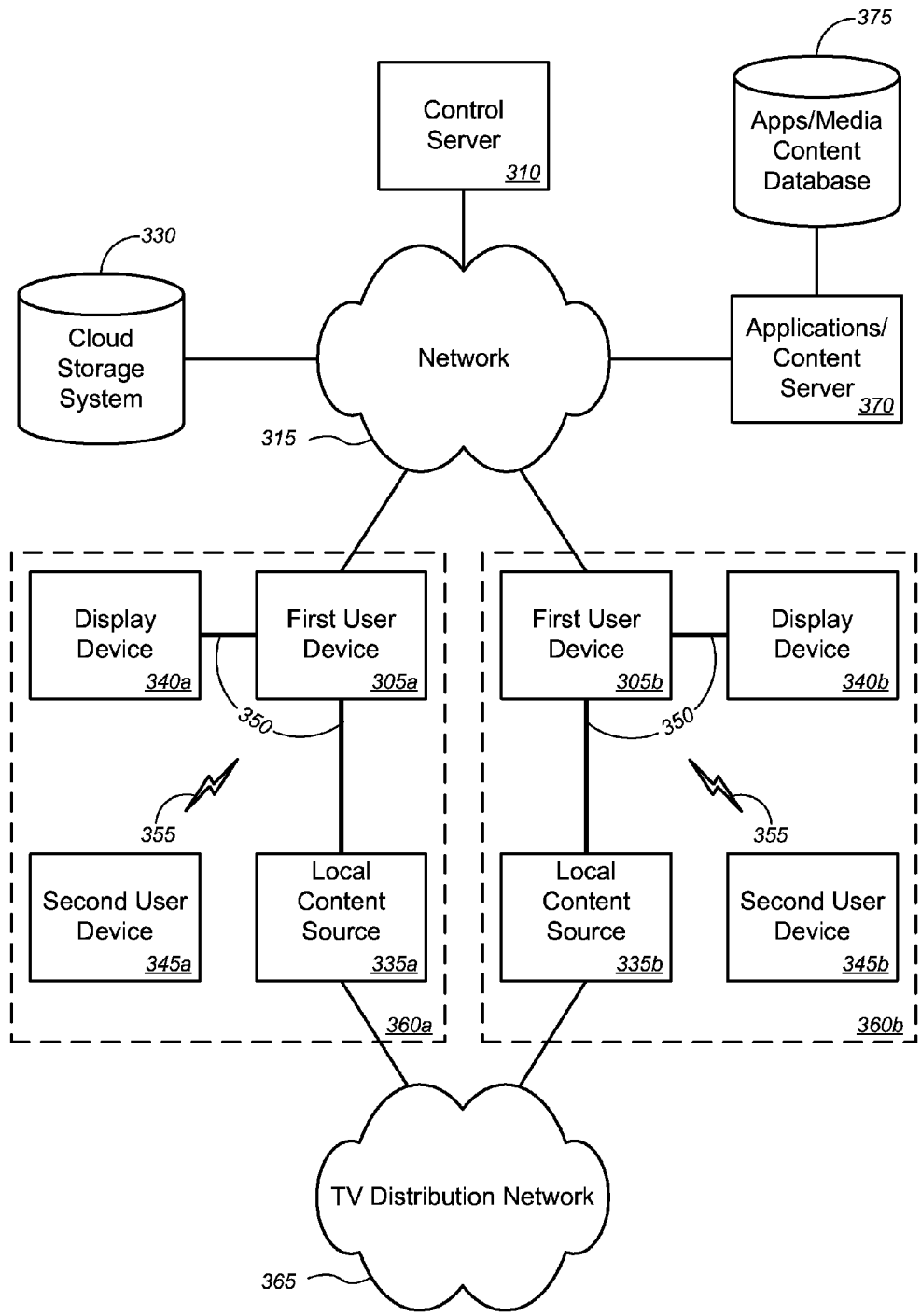
FIG. 3 is a block diagram illustrating another system for implementing distributed infrastructure for cloud computing, cloud-based application hosting, and/or cloud-based data storage, in accordance with various embodiments.

FIG. 3 illustrates a functional diagram of a system 300 for controlling one or more user devices 305 (which can be considered a type of user device 105). The skilled reader should note that the arrangement of the components illustrated in FIG. 3 is functional in nature, and that various embodiments can employ a variety of different structural architectures. Merely by way of example, one exemplary, generalized architecture for the system 300 is described below with respect to FIG. 5, but any number of suitable hardware arrangements can be employed in accordance with different embodiments.

In FIG. 3, first user device 305 might correspond to user device 105, as described in detail above with respect to FIG. 1, while second user device 345 might correspond to a user device, including, without limitation, a mobile phone, a smart phone, a laptop computer, a desktop computer, a portable gaming device, a portable media player, and/or the like. Control server 310, network 315, and cloud storage system 330, in the example of FIG. 3, might correspond to control server 110, network 115, and cloud storage system 130, respectively, as described in detail above with respect to FIG. 1.

System 300 might further comprise a local content source 335 (e.g., a local content source as described above), a display device 340 (including, without limitation, a television ("TV")), and high-definition ("HD") data cables 350 (or any other suitable data transmission media). In some cases, the HD data cables 350 might include, without limitation, high-definition multimedia interface ("HDMI") cables or any other suitable HD data cables. One or more of the first user devices 305, as shown in FIG. 3, might be configured to provide pass-through audio and/or video from a local content source 335 to a display device 340 (e.g., using data cables 350). Merely by way of example, in some embodiments, a HD data input port (e.g., a HDMI input port) in the first user device 305 allows HD signals to be input from the corresponding local content source 335, and a HD data output port (e.g., a HDMI output port) in the first user device 305 allows HD signals to be output from the first user device 305 to the corresponding display device 340 (e.g., TV, which might include, but is not limited to, an Internet Protocol TV ("IPTV"), a HDTV, a cable TV, or the like). The output HD signal may, in some cases, be the input HD signal modified by the first user device 305. Local content source 335 might be any suitable local content source. As noted above, a local content source can be any device that provides an audio or video stream to a display device and thus can include, without limitation, a cable or satellite set-top box ("STB"), an Internet Protocol television ("IPTV") STB, devices that generate video and/or audio, and/or acquire video and/or audio from other sources, such as the Internet, and provide that video/audio to a display device; hence a local content source can include devices such as a video game console, a Roku® streaming media player, an AppleTV®, and/or the like. Hence, when situated functionally inline between a local content source and a display device, the user device can receive an audiovisual stream output from the local content source, modify that audiovisual stream in accordance with the methods described in the '182 patent, and provide the (perhaps modified) audiovisual stream as input to the display device 340. In some embodiments, first user device 305a, local content source 335a, display device 340a, and second user device 345a (if any) might be located at a first customer premises 360a, while first user device 305b, local content source 335b, display device 340b, and second user device 345b (if any) might be located at a second customer premises 360b.

According to some embodiments, system 300 might further comprise one or more access points (not shown), each of which might be located in proximity to or in the first customer premises 360a and/or the second customer premises 360b. The access point(s) can allow wireless communication between each first user device 305 and network 315. (Of course, a first user device 305 might also have a wired connection to an access point, router, residential gateway, etc., such as via an Ethernet cable, which can provide similar communication functionality.) In some cases (as shown), each first user device 305 might be communicatively coupled to network 315 (via either wired or wireless connection), without routing through any access points. In some cases, wired or wireless access to network 315 allows first user device 305 to obtain profiles from cloud storage system 330 and/or media content from content server 370 and media content database 375 independent of the corresponding local content source 335, which is in communication with a television ("TV") distribution network 365 (either via wireless connection or via wired connection). In some cases (not shown), TV distribution network 365 (which could be, for example, a cable television distribution network, a satellite television distribution network, an Internet Protocol television ("IPTV") distribution network, and/or the like) might be communicatively coupled with content server 370, and thus local content source 335 might obtain media content from content server 370 and media content database 375 independently of first user device 305. Alternatively or in addition, the television distribution network 365 might be communicatively coupled to other content servers and/or other media content sources (not shown).

In this manner, first user device 305 can overlay the input signal from the corresponding local content source 335 with additional media content to produce an augmented output HD signal to the corresponding display device 340 via data cables 350. This functionality allows for supplemental content (which may be associated with the media content accessed by the local content source 335 for display on display device 340) to be accessed and presented using the first user device 305, in some cases, as a combined presentation on the display device 340, which may be one of an overlay arrangement (e.g., a picture-in-picture ("PIP") display, with the supplemental content overlaid on the main content), a split screen arrangement (with the supplemental content adjacent to, but not obscuring any portion of the main content), a passive banner stream (with non-interactive supplemental content streaming in a banner(s) along one or more of a top, bottom, left, or right edge of a display field in which the main content is displayed on display device 340), and/or an interactive banner stream (with interactive supplemental content streaming in a banner(s) along one or more of a top, bottom, left, or right edge of a display field in which the main content is displayed on display device 340). Herein, examples of interactive supplemental content might include, without limitation, content that when streamed in a banner can be caused to slow, stop, and/or replay within the banner, in response to user interaction with the content and/or the banner (as opposed to passive banner streaming, in which information is streamed in a manner uncontrollable by the user). The interactive supplemental content that is streamed in the banner may, in some instances, also allow the user to invoke operations or functions by interacting therewith; for example, by the user highlighting and/or selecting the supplemental content (e.g., an icon or still photograph of a character, actor/actress, scene, etc. associated with the main content), links for related webpages, links to further content stored in media content database 375, or operations to display related content on display device 340 and/or second user device 345 may be invoked.

System 300 might otherwise function in a similar manner as described above with respect to system 100 and method 200 in terms of the implementation of distributed infrastructure for cloud computing, cloud-based application hosting, and/or cloud-based data storage.

Figure 4:
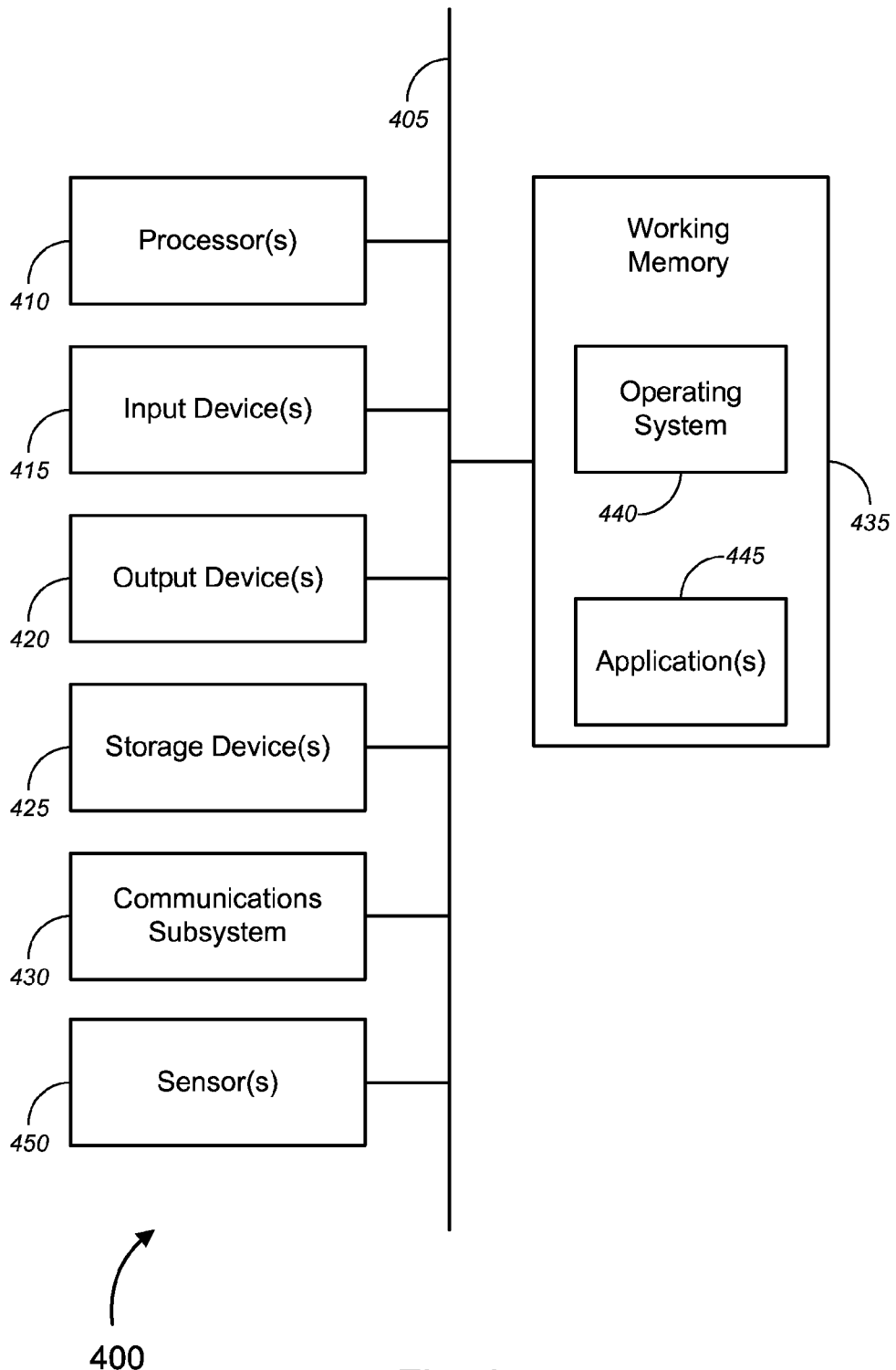
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as a user device, control server, web server, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

According to some embodiments, system 400 might further comprise one or more sensors 450, which might include, without limitation, one or more cameras, one or more IR sensors, and/or one or more 3D sensors, or the like. In some cases, the one or more sensors 450 might be incorporated in (or might otherwise be one of) the input device(s) 415. The output device(s) 420 might, in some embodiments, further include one or more monitors, one or more TVs, and/or one or more display screens, or the like.

The terms "machine readable medium" and "computer readable medium," as used herein, refer to any medium that participates in providing data that causes a machine to operate in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

As noted above, a set of embodiments comprises systems collecting presence information and/or delivering information (including, without limitation, profiles and/or content) to a user on a user device, based on presence information, regardless of whether the user device is owned by and/or associated with the user. FIG. 5 illustrates a schematic diagram of a system 500 that can be used in accordance with one set of embodiments. The system 500 can include one or more user computers 505. In particular, a user computer 505 can be a user device (such as user device 105, 305, or 345), as described above. More generally, a user computer 505 can be a general purpose personal computer (including, merely by way of example, desktop computers, workstations, tablet computers, laptop computers, handheld computers, mobile phones, smart phones, and the like), running any appropriate operating system, several of which are available from vendors such as Apple, Microsoft Corp., as well as a variety of commercially-available UNIX™ or UNIX-like operating systems. A user computer 505 can also have any of a variety of applications, including one or more applications configured to perform methods provided by various embodiments (as described above, for example), as well as one or more office applications, database client and/or server applications, and/or web browser applications. Alternatively, a user computer 505 can be any other electronic device, such as a thin-client computer, Internet-enabled mobile telephone, and/or personal digital assistant, capable of communicating via a network (e.g., the network 510 described below) and/or of displaying and navigating web pages or other types of electronic documents. Although the exemplary system 500 is shown with two user computers 505, any number of user computers can be supported.

Certain embodiments operate in a networked environment, which can include a network 510. The network 510 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 510 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 515. Each of the server computers 515 may be configured with an operating system, including without limitation any of those discussed above with respect to the user computers 505, as well as any commercially (or freely) available server operating systems. Each of the servers 515 may also be running one or more applications, which can be configured to provide services to one or more clients 505 and/or other servers 515.

Merely by way of example, one of the servers 515 might be a control server, with the functionality described above. In another embodiment, one of the servers might be a web server, which can be used, merely by way of example, to provide communication between a user computer 505 and a control server, for example, to process requests for web pages or other electronic documents from user computers 505 and/or to provide user input to the control server. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform operations in accordance with methods provided by various embodiments.

The server computers 515, in some embodiments, might include one or more application servers, which can be configured with one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 505 and/or another server 515. In some embodiments, an application server can create web pages dynamically for displaying the information in accordance with various embodiments, such as providing a user interface for a control server, as described above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application miming on a user computer 505 and/or another server 515. Alternatively, as those skilled in the art will appreciate, a file server can include all necessary files, allowing such an application to be invoked remotely by a user computer 505 and/or server 515.

It should be noted that the functions described with respect to various servers herein (e.g., application server, database server, web server, file server, etc.) can be performed by a single server and/or a plurality of specialized servers, depending on implementation-specific needs and parameters. Further, as noted above, the functionality of one or more servers 515 might be implemented by one or more containers or virtual machines operating in a cloud environment and/or a distributed, cloud-like environment based on shared resources of a plurality of user devices.

In certain embodiments, the system can include one or more data stores 520. The nature and location of the data stores 520 is discretionary: merely by way of example, one data store 520 might comprise a database 520a that stores information about master accounts, assigned user devices, etc. Alternatively and/or additionally, a data store 520b might be a cloud storage environment for storing uploaded images and/or video. As the skilled reader can appreciate, the database 520a and the cloud storage environment 520b might be collocated and/or separate from one another. Some or all of the data stores 520 might reside on a storage medium local to (and/or resident in) a server 515a. Conversely, any of the data stores 520 (and especially the cloud storage environment 520b) might be remote from any or all of the computers 505, 515, so long as it can be in communication (e.g., via the network 510) with one or more of these. In a particular set of embodiments, a database 520a can reside in a storage-area network ("SAN") familiar to those skilled in the art, and/or the cloud storage environment 520b might comprise one or more SANs. (Likewise, any necessary files for performing the functions attributed to the computers 505, 515 can be stored locally on the respective computer and/or remotely, as appropriate.) In one set of embodiments, the database 520a can be a relational database, such as an Oracle database, that is adapted to store, update, and retrieve data in response to SQL-formatted commands. The database might be controlled and/or maintained by a database server, as described above, for example.

As noted above, the system can also include one or more user devices 525 (which might include user device 105 or 305, for example). Although only two such devices are illustrated in FIG. 5, it should be appreciated that any number of user devices 525 can be controlled in accordance with various embodiments. Using the techniques described herein, a control server 515 can control the operation of the user device(s) 525 e.g., by performing operations in accordance with the methods described above. The one or more user devices 525 may also be established as distributed infrastructure elements for cloud computing, cloud-based application hosting, and/or cloud-based data storage, in accordance with the various embodiments described in detail above. The one or more user devices 525 might also serve the one or more functions of server 515 and/or database 520, as described in detail above.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    communicatively coupling a plurality of user devices together in a network, each of the plurality of user devices being located in one of a plurality of customer premises, and each user device comprising:
        a video input interface to receive video input from a local content source;
        an audio input interface to receive audio input from the local content source;
        a video output interface to provide video output to a video display device;
        an audio output interface to provide audio output to an audio receiver;
        a video capture device to capture at least one of image data or video data;
        an audio capture device to capture audio data;
        a network interface;
        at least one processor; and
        a storage medium in communication with the at least one processor;
    establishing, with a computer, one or more user devices of the plurality of user devices as distributed infrastructure elements of a distributed infrastructure of a cloud computing system to share resources of the one or more user devices with the cloud computing system as part of the distributed infrastructure and host content associated with users separate from users associated with the one or more user devices, the one or more user devices being of a type of user device including one of a gaming console or a dedicated video communication device, and the shared resources including one or more of at least a portion of random access memory of the one or more user devices, at least a portion of nonvolatile storage of the one or more user devices, or at least a portion of processing capacity of the one or more user devices;
    providing, with the computer, at least one of one or more software applications, customer data, or media content to the one or more user devices for hosting on the one or more user devices within the distributed infrastructure of the cloud computing system, the at least one of one or more software applications, customer data, or media content being associated with the users separate from the users associated with the one or more user devices, on which the at least one of one or more software applications, customer data, or media content are being hosted;
    monitoring, with the computer, usage of a user device, among the one or more user devices, as a distributed infrastructure element over a first period of time; and
    determining, with the computer, compensation to an owner of the user device for usage of the user device as a distributed infrastructure element over the first period of time.

2. The method of claim 1, wherein each of the plurality of user devices adheres to one of a limited number of classes of hardware, each class of hardware having a known, common hardware configuration, the method further comprising:
  determining, with the computer, a class of each of the plurality of user devices; and
  determining, with the computer, capabilities of each user device, based on the determined class of each user device;
  wherein providing the at least one of one or more software applications, customer data, or media content to the one or more user devices comprises providing the at least one of one or more software applications, customer data, or media content to the one or more user devices based at least in part on the determined capabilities of each user device.

3. The method of claim 1, wherein the computer is at least one of the plurality of user devices.

4. The method of claim 3, wherein the computer is at least one of the one or more user devices that are established as distributed infrastructure elements.

5. The method of claim 1, wherein the computer is a control server in communication with the plurality of user devices over the network.

6. The method of claim 1, further comprising:
  determining, with the computer, a redundancy level for hosting each of the at least one of the one or more software applications, the customer data, or the media content across the one or more user devices.

7. The method of claim 6, wherein providing the at least one of one or more software applications, customer data, or media content to the one or more user devices for hosting on the one or more user devices comprises providing, with the computer, the at least one of one or more software applications, customer data, or media content to the one or more user devices, based at least in part on the determined redundancy level for hosting each of the at least one of the one or more software applications, the customer data, or the media content across the one or more user devices.

8. The method of claim 1, further comprising:
  collecting, with the computer, resource usage information for each of the one or more user devices; and
  collecting, with the computer, network connectivity information for each of the one or more user devices.

9. The method of claim 8, further comprising:
  determining, with the computer, suitability of each of the one or more user devices to host the at least one of one or more software applications, customer data, or media content, based at least in part on one or more of the collected resource usage information or the collected network connectivity information.

10. The method of claim 1, further comprising:
  receiving, with the computer, user input from a user among a plurality of users indicating what type of software applications, customer data, or media content are permitted to be hosted on a user device owned by the user;
  receiving, with the computer, user input from the user indicating at least one of a level of processing power or a level of storage on the user device owned by the user that is permitted for hosting the indicated type of software applications, customer data, or media content;
  labelling, with the computer, each of the one or more user devices with at least one of a first label or a second label, wherein the first label indicates type of distributed hosting, based on the indicated type of software applications, customer data, or media content, and wherein the second label indicates capacity of distributed hosting, based on the at least one of the indicated level of processing power or the indicated level of storage.

11. The method of claim 10, further comprising:
  determining, with the computer, suitability of each of the one or more user devices to host the at least one of one or more software applications, customer data, or media content, based at least in part on one or more of the first label or the second label.

12. The method of claim 11, wherein providing the at least one of one or more software applications, customer data, or media content to the one or more user devices for hosting on the one or more user devices comprises providing, with the computer, the at least one of one or more software applications, customer data, or media content to the one or more user devices, based at least in part on at least one of the first label, the second label, or the determined suitability of each of the one or more user devices to host the at least one of one or more software applications, customer data, or media content.

13. The method of claim 1, wherein establishing the one or more user devices of the plurality of user devices as distributed infrastructure elements comprises installing, with the computer, software on at least two user devices of the one or more user devices to enable distributed processing of software applications across the at least two user devices.

14. The method of claim 1, wherein establishing the one or more user devices of the plurality of user devices as distributed infrastructure elements comprises installing, with the computer, software on at least two user devices of the one or more user devices to enable hosting of software applications across the at least two user devices.

15. The method of claim 1, wherein establishing the one or more user devices of the plurality of user devices as distributed infrastructure elements comprises installing, with the computer, software on at least two user devices of the one or more user devices to enable distributed storage of one or more of customer data or media content across the at least two user devices.

16. The method of claim 1, wherein providing the at least one of one or more software applications, customer data, or media content to the one or more user devices for hosting on the one or more user devices comprises providing, with the computer, mirrored copies of the at least one of one or more software applications, customer data, or media content to each of at least two user devices of the one or more user devices.

17. The method of claim 1, wherein providing the at least one of one or more software applications, customer data, or media content to the one or more user devices for hosting on the one or more user devices comprises providing, with the computer, portions of each of the at least one of one or more software applications, customer data, or media content to each of at least two user devices of the one or more user devices.

18. The method of claim 1, further comprising:
  monitoring, with the computer, one or more of performance of at least one user device of the one or more user devices, or performance of the distributed infrastructure elements, as a whole.

19. The method of claim 18, further comprising:
  determining, with the computer, one or more courses of action to invoke, based at least in part on one or more of performance metrics of the at least one user device, or performance metrics of the distributed infrastructure elements, as a whole; and
  invoking, with the computer, the one or more courses of action, based on said determination.

20. The method of claim 1, further comprising:
receiving, with the computer, sensor input collected by one or more of the user devices established as distributed infrastructure elements.

21. A user device among a plurality of user devices, comprising:
a video input interface to receive video input from a local content source;
an audio input interface to receive audio input from the local content source;
a video output interface to provide video output to a video display device;
an audio output interface to provide audio output to an audio receiver;
a video capture device to capture at least one of image data or video data;
an audio capture device to capture audio data;
a network interface;
at least one processor; and
a storage medium in communication with the at least one processor, the storage medium having encoded thereon a set of instructions executable by the at least one processor to control operation of the user device, the set of instructions comprising:
instructions to establish one or more other user devices of the plurality of user devices as distributed infrastructure elements of a distributed infrastructure of a cloud computing system to share resources of the one or more user devices with the cloud computing system as part of the distributed infrastructure and host content associated with users separate from users associated with the one or more other user devices the one or more other user devices being of a type of user device including one of a gaming console or a dedicated video communication device, and the shared resources including one or more of at least a portion of random access memory of the one or more of at least a portion of random access memory of the one or more user devices, at least a portion of nonvolatile storage of the one or more user devices, or at least a portion of processing capacity of the one or more user devices;
instructions to provide at least one of one or more software applications, customer data, or media content to the one or more other user devices for hosting on the one or more other user devices within the distributed infrastructure of the cloud computing system, the at least one of one or more software applications, customer data, or media content being associated with the users separate from the users associated with the one or more other user devices, on which the at least one of one or more software applications, customer data, or media content are being hosted;
instructions to monitor usage of a user device, among the one or more user devices, as a distributed infrastructure element, over a first period of time; and
instructions to determine compensation to an owner of the user device for usage of the user device as a distributed infrastructure element over the first period of time.

22. The user device of claim 21, wherein the network interface is configured to communicate with at least one other user device among the one or more user devices over a network.

23. A user device, comprising:
a video input interface to receive video input from a local content source;
an audio input interface to receive audio input from the local content source;
a video output interface to provide video output to a video display device;
an audio output interface to provide audio output to an audio receiver;
a video capture device to capture at least one of image data or video data;
an audio capture device to capture audio data;
a network interface;
at least one processor; and
a storage medium in communication with the at least one processor, the storage medium having encoded thereon a set of instructions executable by the at least one processor to control operation of the user device, the set of instructions comprising:
instructions to receive, from a computer, instructions to reconfigure to become a distributed infrastructure element of a distributed infrastructure of a cloud computing system;
instructions to reconfigure into a distributed infrastructure element of the distributed infrastructure of the cloud computing and share resources of the user device with the cloud computing system as part of the distributed infrastructure, the shared resources including one or more of at least a portion of random access memory of the user device, at least a portion on nonvolatile storage of the user device, or at least a portion of processing capacity of the user device;
instructions to receive at least one of one or more software applications, customer data, or media content provided from the computer to host content associated with users to separate from a user associated with the user device, the user device being among one or more user devices that are of a type of user device including one of a gaming console or a dedicated video communication device; and
instructions to host the at least one of one or more software applications, customer data, or media content within the distributed infrastructure of the cloud computing system, the at least one of one or more software applications, customer data, or media content being associated with the users separate from the user associated with the user device, on which the at least one of one or more software applications, customer data, or media content are being hosted, wherein the usage of the user device as a distributed infrastructure element is monitored over a first period of time, and compensation to an owner of the user device is determined based on the usage of the user device as a distributed infrastructure element over the first period of time.

24. The user device of claim 23, wherein the network interface is configured to communicate with the computer and at least one other user device among one or more user devices over a network.

25. A system, comprising:
a computer, comprising:
at least one first processor; and
a first storage medium in communication with the at least one first processor, the first storage medium having encoded thereon a first set of instructions executable by the at least one first processor to control operation of one or more user devices of a plurality of user devices, the first set of instructions comprising:
instructions to establish the one or more user devices as distributed infrastructure elements of a distributed infrastructure of a cloud computing system; and
instructions to provide at least one of one or more software applications, customer data, or media content to the one or more user devices for hosting on the one or more user devices; and the one or more user devices, each comprising:
- a video input interface to receive video input from a local content source;
- an audio input interface to receive audio input from the local content source;
- a video output interface to provide video output to a video display device;
- an audio output interface to provide audio output to an audio receiver;
- a video capture device to capture at least one of image data or video data;
- an audio capture device to capture audio data;
- a network interface;
- at least one second processor; and
- a second storage medium in communication with the at least one second processor, the second storage medium having encoded thereon a second set of instructions executable by the at least one second processor to control operation of the user device, the second set of instructions comprising:
  - instructions to receive, from the computer, instructions to reconfigure to become a distributed infrastructure element of the distributed infrastructure of the cloud computing system;
  - instructions to reconfigure into a distributed infrastructure element of the distributed infrastructure of the cloud computing system and share resources of the user device with the cloud computing system as part of the distributed infrastructure, based on the instructions received from the computer, the shared resources including one or more of at least a portion of random access memory of the user device at least a portion of nonvolatile storage of the user device, or at least a portion of processing capacity of the user device;
  - instructions to receive the at least one of one or more software applications, customer data, or media content provided from the computer to host content associated with users separate from users associated with the one or more user devices, the one or more user devices being of a type of user device including one of a gaming console or a dedicated video communication device; and
  - instructions to host the at least one of one or more software applications, customer data, or media content within the distributed infrastructure of the cloud computing system, the at least one of one or more software applications, customer data, or media content being associated with the users separate from the users associated with the one or more user devices, on which the at least one of one or more software applications, customer data, or media content are being hosted;

wherein the first set of instructions further comprises:
- instructions to monitor usage of a user device owned by a user, among the one or more user devices, as a distributed infrastructure element, over a first period of time; and instructions to determine compensation to an owner of the user device for usage of the user device as a distributed infrastructure element over the first period of time.

26. The system of claim 25, wherein the computer is at least one of the plurality of user devices.

27. The system of claim 26, wherein the computer is at least one of the one or more user devices that are established as distributed infrastructure elements.

28. The system of claim 25, wherein the computer is a control server in communication with the one or more user devices over a network.

29. The system of claim 25, wherein the network interface is configured to communicate with at least one of the computer over a network or at least one other user device among the one or more user devices over the network.

* * * * *